(12) United States Patent
Jayakumar et al.

(10) Patent No.: US 9,645,829 B2
(45) Date of Patent: May 9, 2017

(54) TECHNIQUES TO COMMUNICATE WITH A CONTROLLER FOR A NON-VOLATILE DUAL IN-LINE MEMORY MODULE

(71) Applicant: INTEL CORPORATION, Santa Clara, CA (US)

(72) Inventors: Sarathy Jayakumar, Portland, OR (US); Mohan J. Kumar, Aloha, OR (US); Adam J. Brooks, Phoenix, AZ (US); George Vergis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 44 days.

(21) Appl. No.: 14/319,361

(22) Filed: Jun. 30, 2014

(65) Prior Publication Data
US 2015/0378841 A1    Dec. 31, 2015

(51) Int. Cl.
| | | |
|---|---|---|
| *G06F 11/14* | (2006.01) | |
| *G06F 9/44* | (2006.01) | |
| *G06F 11/20* | (2006.01) | |

(52) U.S. Cl.
CPC ........ *G06F 9/4401* (2013.01); *G06F 11/1441* (2013.01); *G06F 11/2015* (2013.01)

(58) Field of Classification Search
CPC ............. G06F 11/1469; G06F 11/1441; G06F 9/4401; G06F 3/0679; G06F 3/0655; G06F 3/0634; G11C 5/141; G11C 5/143; G11C 5/04
See application file for complete search history.

(56) References Cited

U.S. PATENT DOCUMENTS

| | | | | |
|---|---|---|---|---|
| 2010/0202237 | A1* | 8/2010 | Moshayedi | G11C 5/141 365/228 |
| 2010/0202239 | A1 | 8/2010 | Moshayedi et al. | |
| 2010/0205470 | A1* | 8/2010 | Moshayedi | G11C 5/141 713/340 |
| 2011/0239021 | A1* | 9/2011 | Vedder | G06F 1/263 713/323 |
| 2012/0131253 | A1* | 5/2012 | McKnight | G06F 1/30 710/308 |
| 2012/0151118 | A1* | 6/2012 | Flynn | G06F 11/1008 711/6 |
| 2012/0198136 | A1* | 8/2012 | Moshayedi | G06F 11/1658 711/103 |
| 2013/0086309 | A1* | 4/2013 | Lee | G06F 12/0246 711/103 |
| 2015/0186278 | A1* | 7/2015 | Jayakumar | G06F 12/0804 711/103 |

OTHER PUBLICATIONS

International Search Report and Written Opinion received for PCT Patent Application No. PCT/US2015/032922, mailed Aug. 31, 2015, 14 pages.

* cited by examiner

*Primary Examiner* — Nadeem Iqbal

(57) ABSTRACT

Examples may include communicating with a controller for a non-volatile dual in-line memory module through a system management bus (SMBus) interface. In some examples, selective assertion of bits maintained in registers accessible through the SMBus interface may enable communication with the controller. The selective assertion may be based on a register map.

25 Claims, 19 Drawing Sheets

Register Map Portion 200
(Header)

| Field Name | Offset | Length | Access | Description |
|---|---|---|---|---|
| PAGE_NUM | 0x00 | 1 | RW | BIT[2:0]: Page Number<br>BIT[5:3]: Maximum Number of pages<br>BIT[7:6]: Reserved |
| HWREV | 0x01 | 1 | RO | Hardware Revision Info |
| FWREV | 0x02 | 2 | RO | Firmware Revision Info |
| GENCAP | 0x04 | 1 | RO | BIT 0: SAVE Command Class Supported<br>BIT 1: RESTORE Command Class Supported<br>BIT 2: ERASE Command Class Supported<br>BIT 3: Enable Catastrophic SAVE (ARM) Command Class Supported<br>BIT 4: Health Check Command Class Supported<br>BIT [6:5]: Reserved. Must be 0<br>BIT 7: Extended Capabilities Supported |
| EXTCAP | 0x05 | 1 | RO | Extended Capabilities Structure. |
| Validation Bits | 0x06 | 1 | RO | Specifies which of these fields have valid data<br>BIT 0: Number of SAVE regions<br>BIT 1: Save Latency Valid<br>BIT 2: Restore Latency Valid<br>BIT 3: Controller Ready latency Valid<br>BIT 4: Command Accepted (CA) Latency Valid<br>BIT 5: Super Cap Charging time Valid |
| Number of SAVE regions | 0x07 | 1 | RO | SAVE regions in the NVDIMM<br>Valid Values = 1 to N |
| SAVE Latency | 0x08 | 2 | RO | Worst case - default region (REGION-0) |
| RESTORE Latency | 0x0A | 2 | RO | Worst case - default region (REGION -0) |
| Controller Ready Latency T (CR) | 0x0C | 2 | RO | Worst case - NVDIMM controller ready after power-up or reset.<br>BIT15: 0 – Indicates Time-out in ms<br>        1 – Indicates time-out in secs<br>BIT[14:0]: Time-out value |
| Command Accepted Latency T(CA) | 0x0E | 2 | RO | Worst case - CA bit to be set by the controller on receipt of a command. Used by requestor to time-out.<br>BIT15: 0 – Time-out in µs<br>        1 – Time-out in ms<br>BIT[14:0]: Time-out value |
| Capacitor charging time | 0x10 | 2 | RO | Worst case capacitor charging time in secs (0V to Peak V). |
| EXTCAP | 0x12 | 1 | RO | Extended Capabilities Structure. |
| Page switching latency | 0x13 | 1 | RO | Amount of time requestor has to wait for page switching to happen, before it times-out, in ms |
| Energy Required | 0x14 | 2 | RO | Energy required by the NVDIMM for Catastrophic SAVE operation, in Joules. |
| Reserved | 0x16 | 10 | RO | Reserved |

*FIG. 2*

Register Map Portion 300
(NVDIMM STATE Class)

| Field Name | Offset | Length | Access | Description |
|---|---|---|---|---|
| GET_NVDIMM_STATE | 0X20 | 1 | RW | Get NVDIMM state command<br>BIT7 – (RA) Request Accepted.<br>BIT6 – (SV) Status Valid<br>BIT5 – Reserved<br>BIT[4:0] - 0x00 – No Operation<br>0x01: Return NVDIMM status<br>0x02: Clear NVDIMM status<br>0x03: Reset controller<br>0x04 to 0x7F: Reserved<br>0x80 - 0xFF: Vendor defined |
| Reserved | 0x21 | 1 | RO | Reserved |
| T(NvState.SV) | 0x22 | 2 | RO | Valid only when GET_NVDIMM_STATE.CA == 1.<br>BIT15: 0 – Time-out in ms<br>        1 – Time-out in seconds.<br>BIT[14:0]: Time-out value for requestor while waiting for corresponding SV bit to be set. |
| NVDIMM_STATUS | 0x24 | 2 | RO | Valid only when GET_NVDIMM_STATE.SV == 1<br>BIT0: 0 - Controller NOT busy<br>      1 - Controller busy<br>BIT 1: SAVE in progress, if set<br>BIT 2: ABORT SAVE in progress, if set<br>BIT 3: RESTORE in progress, if set<br>BIT 4: ABORT_RESTORE in progress, if set<br>BIT 5: ERASE in progress, if set<br>BIT 6: ABORT_ERASE in progress, if set<br>BIT 7: 0 – SAVE# pin not asserted on previous boot<br>      1 – SAVE# pin asserted on previous boot, triggering a catastrophic save<br>BIT 8: 0 – Catastrophic SAVE successful<br>      1 - Catastrophic SAVE not successful<br>(This BIT is valid only if either BIT7 or BIT8 is set)<br>BIT[15:9]: Reserved |
| BUSY_TIMEOUT T(Busy) | 0x26 | 2 | RO | Valid only when NVDIMM_STATUS.BUSY == 1.<br>BIT15: 0 –Time-out in ms<br>      1 –Time-out in sec.<br>BIT [14:0]: Time-out value that requestor uses waiting for NVDIMM_STATUS.BUSY == 0. |

*FIG. 3*

Register Map Portion 400
(SAVE Class)

| Field Name | Offset | Length | Access | Description |
|---|---|---|---|---|
| SAVE_CMD | 0x28 | 1 | RW | SAVE command<br>BIT7: (CA) Command Accepted<br>BIT6: (SV) Status Valid.<br>BIT5: (GUID_V) Image GUID Valid.<br>    0 - Image GUID not valid. SAVE to<br>        default region<br>    1- Image GUID is valid<br>BIT[4:0]: Command<br>    0x00: No Operation<br>    0x01: Start the SAVE operation<br>    0x00 - 0xFF: Reserved<br>    0x100 – 0x1FF: Vendor Defined |
| ABORT_SAVE | 0x29 | 1 | RW | ABORT SAVE command<br>BIT7: (CA) Command Accepted<br>BIT6: (SV) Status Valid<br>BIT5: (GUID_V) Image GUID Valid<br>    0 - Image GUID not valid. Abort Save<br>        to default region<br>    1 - Image GUID is valid<br>BIT[4:0]: Command<br>    0x00: No Operation<br>    0x01: ABORT the SAVE operation<br>    0x00 - 0xFF: Reserved<br>    0x100 - 0x1FF: Vendor Defined |
| T(Save.SV) | 0x2A | 2 | RO | Valid only when SAVE_CMD.CA == 1 OR ABORT_SAVE.CA == 1<br>BIT15: 0 – Indicates Time-out in ms<br>        1 – Indicates Time-out in secs<br>BIT[14:0]: Time-out value that the requestor will use while waiting for corresponding SV bit to be set |
| Reserved | 0x2C | 2 | RO | Reserved |
| SAVE_STATUS | 0x2E | 2 | RO | Status Field. Valid only if SAVE_CMD.SV == 1 OR ABORT_SAVE.SV == 1<br>0x0000: SAVE Successfully completed<br>0x0001: ERROR. SAVE failure<br>0x0002: ABORT successful<br>0x0003: ERROR. Abort Failure<br>0x0004 – 0x7FFF: Reserved<br>0x8000 – 0xFFFF: Reserved |
| SAVE_IMAGE_GUID | 0x30 | 8 | RW | IMAGE_GUID associated with the SAVE/ABORT_SAVE/GET_SAVE_STS command |

*FIG. 4*

Register Map Portion 500
(RESTORE Class)

| Field Name | Offset | Length | Access | Description |
|---|---|---|---|---|
| RESTORE_CMD | 0x38 | 1 | RW | RESTORE command<br>BIT7: (CA) Command Accepted<br>BIT6: (SV) Status Valid.<br>BIT5: (GUID_V) Image GUID Valid.<br>    0 - Image GUID not valid.<br>        RESTORE default region<br>    1 - Image GUID is valid<br>BIT[4:0]: Command<br>    0x00: No Operation<br>    0x01: Start the RESTORE operation<br>    0x00 - 0xFF: Reserved<br>    0x100 - 0x1FF: Vendor Defined |
| ABORT_RESTORE | 0x39 | 1 | RW | ABORT RESTORE command<br>BIT7: (CA) Command Accepted<br>BIT6: (SV) Status Valid<br>BIT5: (GUID_V) Image GUID Valid<br>    0 - Image GUID not valid. Abort<br>        Restore to default region<br>    1 - Image GUID is valid<br>BIT[4:0]: Command<br>    0x00: No Operation<br>    0x01: ABORT the RESTORE<br>        operation<br>    0x00 - 0xFF: Reserved<br>    0x100 - 0x1FF: Vendor Defined |
| T(Restore.SV) | 0x3A | 2 | RO | Valid only when RESTORE_CMD.CA == 1<br>OR ABORT_RESTORE.CA == 1<br>BIT15: 0 – Indicates Time-out in ms<br>        1 – Indicates Time-out in secs<br>BIT[14:0]: Time-out value that the requestor will use while waiting for corresponding SV bit to be set |
| Reserved | 0x3C | 2 | RO | Reserved |
| RESTORE_STATUS | 0x3E | 2 | RO | Status Field. Valid only if<br>RESTORE_CMD.SV == 1<br>OR ABORT_RESTORE.SV == 1<br>0x0000: RETORE Successfully completed<br>0x0001: ERROR. RESTORE failure<br>0x0002: ABORT successful<br>0x0003: ERROR. Abort Failure<br>0x0004 – 0x7FFF: Reserved<br>0x8000 – 0xFFFF: Reserved |
| RESTORE_IMAGE_GUID | 0x40 | 8 | RW | IMAGE_GUID associated with the RESTORE/ABORT_RESTORE/GET_RESTORE_STS command |

*FIG. 5*

Register Map Portion 600
(ERASE Class)

| Field Name | Offset | Length | Access | Description |
|---|---|---|---|---|
| ERASE_CMD | 0x48 | 1 | RW | ERASE command<br>BIT7: (CA) Command Accepted<br>BIT6: (SV) Status Valid.<br>BIT5: (GUID_V) Image GUID Valid.<br>    0 - Image GUID not valid. ERASE default region<br>    1 - Image GUID is valid<br>BIT[4:0]: Command<br>    0x00: No Operation<br>    0x01: Start the ERASE operation<br>    0x00 - 0xFF: Reserved<br>    0x100 - 0x1FF: Vendor Defined |
| ABORT_ERASE | 0x49 | 1 | RW | ABORT RESTORE command<br>BIT7: (CA) Command Accepted<br>BIT6: (SV) Status Valid<br>BIT5: (GUID_V) Image GUID Valid<br>    0 - Image GUID not valid. Abort Erase to default region<br>    1 - Image GUID is valid<br>BIT[4:0]: Command<br>    0x00: No Operation<br>    0x01: ABORT the RESTORE operation<br>    0x00 - 0xFF: Reserved<br>    0x100 - 0x1FF: Vendor Defined |
| T(Erase.SV) | 0x4A | 2 | RO | Valid only when ERASE_CMD.CA == 1 OR ABORT_ERASE.CA == 1<br>BIT15: 0 – Indicates Time-out in ms<br>    1 – Indicates Time-out in secs<br>BIT[14:0]: Time-out value that the requestor will use while waiting for corresponding SV bit to be set |
| Reserved | 0x4C | 2 | RO | Reserved |
| ERASE_STATUS | 0x4E | 2 | RO | Status Field. Valid only if ERASE_CMD.SV == 1 OR ABORT_ERASE.SV == 1<br>0x0000: ERASE Successfully completed<br>0x0001: ERROR. ERASE failure<br>0x0002: ABORT successful<br>0x0003: ERROR. Abort Failure<br>0x0004 – 0x7FFF: Reserved<br>0x8000 – 0xFFFF: Reserved |
| ERASE_IMAGE_GUID | 0x50 | 8 | RW | IMAGE_GUID associated with the ERASE/ABORT_ERASE/GET_ERASE_STS command |

*FIG. 6*

Register Map Portion 700
(ARM/DISARM Class)

| Field Name | Offset | Length | Access | Description |
|---|---|---|---|---|
| ENABLE_CATASTROPHIC_SAVE (ARM) | 0x58 | 1 | RW | Enables catastrophic save<br>BIT7: (CA) Command Accepted<br>BIT6: (SV) Status Valid.<br>BIT5: Reserved<br>BIT[4:0]: Command<br>    0x00: No Operation<br>    0x01: Start the ARM operation<br>    0x00 - 0xFF: Reserved<br>    0x100 - 0x1FF: Vendor Defined |
| DISABLE_CATASTROPHIC_SAVE (DISARM) | 0x59 | 1 | RW | Disables catastrophic save<br>BIT7: (CA) Command Accepted<br>BIT6: (SV) Status Valid<br>BIT5: Reserved<br>BIT[4:0] – Command<br>    0x00: No Operation<br>    0x01: Start the DISARM operation<br>    0x00 - 0xFF: Reserved<br>    0x100 - 0x1FF: Vendor Defined |
| T(Arm.SV) | 0x5A | 2 | RO | Valid only when ARM_CMD.CA == 1 OR DISARM_CMD.CA == 1<br>BIT15: 0 – Indicates Time-out in ms<br>        1 – Indicates Time-out in secs<br>BIT[14:0]: Time-out value that the requestor will use while waiting for corresponding SV bit to be set |
| Reserved | 0x5C | 2 | RO | Reserved |
| CATASTROPHIC_SAVE_STATUS | 0x5E | 2 | RO | Status Field. Valid only if ARM_CMD.SV == 1 OR DISARM_CMD.SV == 1<br>0x0000: ARM Successfully completed<br>0x0001: ERROR. ARM failure<br>0x0002: DISARM successful<br>0x0003: ERROR. DISARM Failure<br>0x0004 – 0x7FFF: Reserved<br>0x8000 – 0xFFFF: Reserved |

*FIG. 7*

Register Map Portion 800
(Self-Refresh Save Class)

| Field Name | Offset | Length | Access | Description |
|---|---|---|---|---|
| ENABLE_SELFREFRESH_SAVE | 0x60 | 1 | RW | Enables SAVE on Self-refresh<br>BIT7: (CA) Command Accepted<br>BIT6: (SV) Status Valid.<br>BIT5: Reserved<br>BIT[4:0]: Command<br>    0x00: No Operation<br>    0x01: Enable SAVE on Self-refresh<br>    0x00 - 0xFF: Reserved<br>    0x100 - 0x1FF: Vendor Defined |
| DISABLE_SELFREFRESH_SAVE | 0x61 | 1 | RW | Disables SAVE operation on Self-refresh<br>BIT7: (CA) Command Accepted<br>BIT6: (SV) Status Valid<br>BIT5: Reserved<br>BIT[4:0]: Command<br>    0x00: No Operation<br>    0x01: Disable SAVE on Self-refresh<br>    0x00 - 0xFF: Reserved<br>    0x100 - 0x1FF: Vendor Defined |
| T(SrSave.SV) | 0x62 | 2 | RO | Valid only when<br>ENABLE_SELFREFRESH_SAVE.CA == 1<br>OR DISABLE_SELFREFRESH_SAVE.CA == 1<br>BIT15: 0 – Indicates Time-out in ms<br>    1 – Indicates Time-out in secs<br>BIT[14:0]: Time-out value that the requestor will use while waiting for corresponding SV bit to be set |
| Reserved | 0x64 | 2 | RO | Reserved |
| SRSAVE_STATUS | 0x66 | 2 | RO | Status Field. Valid only if<br>ENABLE_SELFREFRESH_SAVE.SV == 1<br>OR DISABLE_SELFREFRESH_SAVE.SV == 1<br>0x0000: SR SAVE enable<br>0x0001: ERROR. SR SAVE enable failure<br>0x0002: SR SAVE disabled<br>0x0003: ERROR. SR SAVE disable Failure<br>0x0004 – 0x7FFF: Reserved<br>0x8000 – 0xFFFF: Reserved |

*FIG. 8*

Register Map Portion 900
(Health Check Class)

| Field Name | Offset | Length | Access | Description |
|---|---|---|---|---|
| GET_HEALTH_STATUS | 0x68 | 1 | RW | Get Health Status<br>BIT7: (RA) Request Accepted<br>BIT6: (SV) Status Valid.<br>BIT5: Reserved<br>BIT[4:0]: Command<br>    0x00: No Operation<br>    0x01: Start the Health Check Operation<br>    0x00 - 0xFF: Reserved<br>    0x100 - 0x1FF: Vendor Defined |
| T(Health.SV) | 0x69 | 2 | RO | Valid only when<br>GET_HEALTH_STATUS.CA == 1<br>BIT15: 0 – Indicates Time-out in ms<br>       1 – Indicates Time-out in secs<br>BIT[14:0]: Time-out value that the requestor will use while waiting for corresponding SV bit to be set |
| HEALTH_STATUS | 0x6B | 2 | RO | Status Field. Valid only if<br>GET_HEALTH_STATUS.SV == 1<br>0x0000: Health Check Complete<br>0x0001: ERROR. Health Check failure<br>0x0002 - 0x7FFF: Reserved<br>0x8000 - 0xFFFF: Reserved |

*FIG. 9*

Storage Medium *1500*

*Computer Executable Instructions for 1400*

*FIG. 15*

**Storage Medium *1800***

*Computer Executable Instructions for 1700*

*FIG. 18*

TECHNIQUES TO COMMUNICATE WITH A CONTROLLER FOR A NON-VOLATILE DUAL IN-LINE MEMORY MODULE

TECHNICAL FIELD

Examples described herein are generally related to a non-volatile dual in-line memory module (NVDIMM).

BACKGROUND

Memory modules coupled with computing platforms or systems such as those configured as a server may include dual in-line memory modules (DIMMs). DIMMs may include types of volatile memory such dynamic random access memory (DRAM). As DRAM technologies have advanced to include memory cells having higher and higher densities, memory capacities for DIMMs have also substantially increased. Since DRAM is a volatile memory, power failures or resets may result in loss of most if not all data maintained in DRAM at the time of power failure or reset. Also, large memory capacities for DRAMs presents a challenge for an operating system (OS) or an application (e.g., device driver) to sense a power failure and attempt to prevent or reduce data loss.

In order to mitigate or reduce data loss in the event of a power failure or reset, a type of memory module that includes both volatile and non-volatile memory has been developed. This type of memory module is commonly referred to as a non-volatile DIMM (NVDIMM). Typically, NVDIMMs are a combination of DRAM and NAND flash. NVDIMMs may provide persistent storage by backing up DRAM contents in a non-volatile memory such as NAND flash in event of a power failure or sudden system reset. A super-capacitor package may be coupled with an NVDIMM to maintain power to the NVDIMM for long enough to back-up data from the DRAM to the non-volatile memory.

An NVDIMM may have a controller resident on or with the NVDIMM to manage or control NVDIMM activities. The NVDIMM controller may manage saving of DRAM contents to non-volatile memory at the NVDIMN. The NVDIMM controller may also manage restoration of the DRAM contents from the non-volatile memory back to the DRAM once system power has been restored. The NVDIMM controller may be arranged to operate in coordination with an OS, device driver, application or basic input/output system (BIOS) for a computing platform coupled with the NVDIMM to save or restore DRAM contents.

BRIEF DESCRIPTION OF THE DRAWINGS

FIG. 2 illustrates a first example register map portion.
FIG. 3 illustrates a second example register map portion.
FIG. 4 illustrates a third example register map portion.
FIG. 5 illustrates a fourth example register map portion.
FIG. 6 illustrates a fifth example register map portion.
FIG. 7 illustrates a sixth example register map portion.
FIG. 8 illustrates a seventh example register map portion.
FIG. 9 illustrates an eighth example register map portion.
FIG. 15 illustrates an example of a first storage medium.
FIG. 18 illustrates an example of a second storage medium.

DETAILED DESCRIPTION

As contemplated in the present disclosure, an NVDIMM may have a NVDIMM controller arranged to operate in coordination with an OS, device driver application or BIOS for a computing platform coupled with the NVDIMM. In some examples, an application, device driver and/or BIOS may interface or communicate through one or more communication interfaces with the NVDIMM controller. When interfacing or communicating with the NVDIMM controller the application, device driver and/or BIOS may issue commands to the NVDIMM controller to save DRAM contents to non-volatile memory at the NVDIMM, restore non-volatile memory content to the DRAM, etc. Numerous manufacturers of NVDIMMs may implement their own proprietary interfaces to communicate with computing platform elements such as an application, device driver and/or BIOS. The use of numerous proprietary interfaces may be an impediment to interoperability and may be problematic to designers of computing platform elements such as an application, device driver and/or BIOS that are designed to support NVDIMMS. It is with respect to these and other challenges that the examples described herein are needed.

Techniques to communicate with a controller for an NVDIMM may be implemented via one or more example methods. A first example method may include a controller receiving a status request. The controller may be for a non-volatile memory capable of preserving data maintained in volatile memory, the non-volatile and the volatile memory resident on an NVDIMM. A status may be determined by the controller responsive to the status request and the status indicated via selective assertion of a first set of bits maintained in a first set of registers. For this first example method, the first set of registers may be accessible to a requestor (e.g., application, device driver or BIOS) of the status request through a system management bus (SMBus) interface.

A second example may include a device driver arranged to be implemented by circuitry at a host computing device. The device driver may send a status request to a controller for a non-volatile memory capable of preserving data maintained in volatile memory, the non-volatile and the volatile memory may be resident on a an NVDIMM coupled with the host computing platform. For this second example method, the device driver may access a first set of bits maintained in a first set of registers through an SMBus interface. The first set of bits may indicate a status provided by the controller responsive to the status request via selective assertion of the first set of bits based on a register map.

Figure 1:
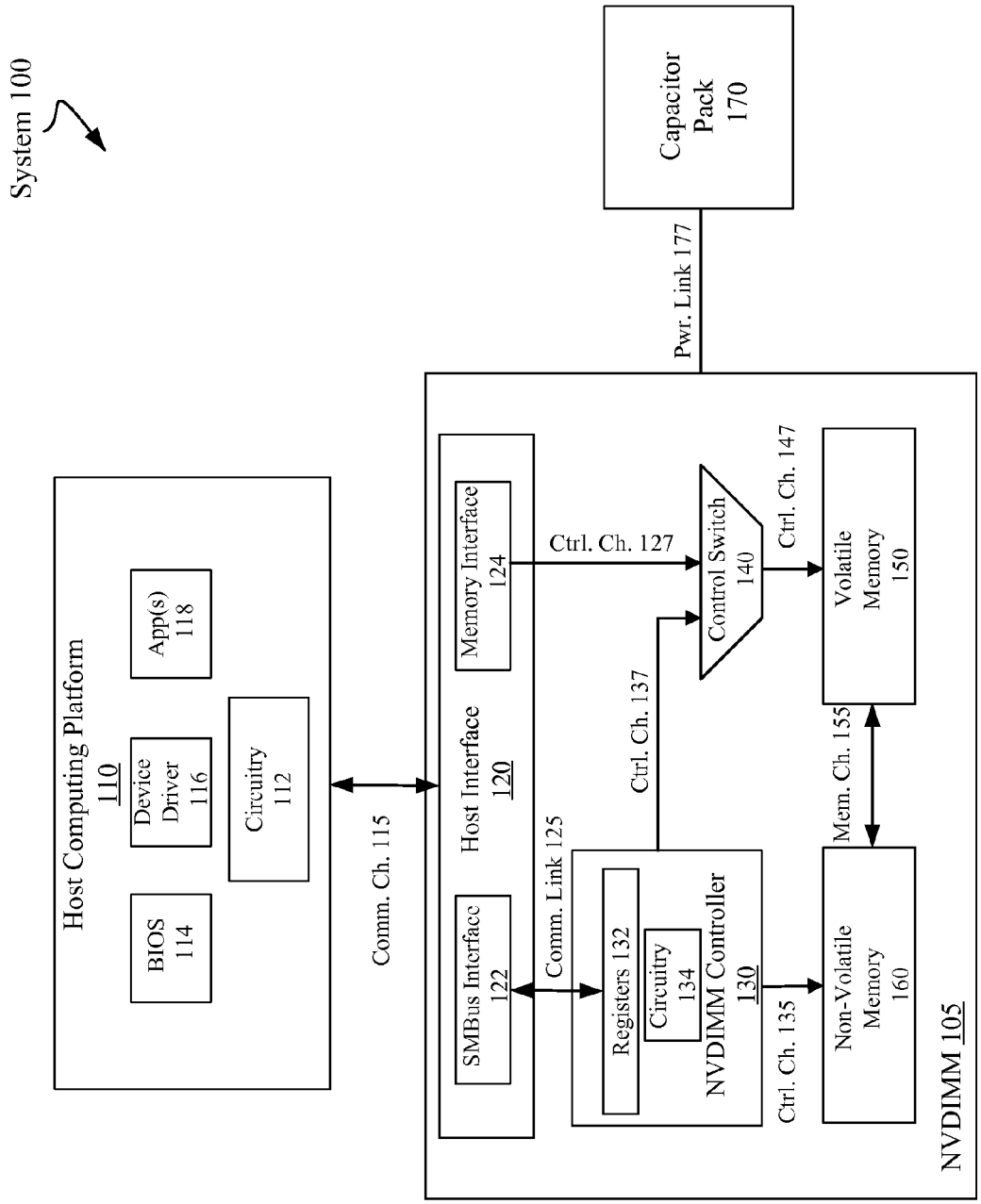
FIG. 1 illustrates an example system.

FIG. 1 illustrates an example system 100. As shown in FIG. 1, system 100 includes a host computing platform 110 coupled to a non-volatile dual in-line memory module (NVDIMM) 105 via communication channel 115. Also shown in FIG. 1, a capacitor pack 170 may couple to NVDIMM 105 via a power link 177. In some examples, as shown in FIG. 1, NVDIMM 105 may also include a host interface 120, an NVDIMM controller 130, a control switch 140, a volatile memory 150 or a non-volatile memory 160.

In some examples, host computing platform 110 may include circuitry 112 capable of executing various functional elements of host computing platform 110 that may include, but is not limited to a basic input/output system (BIOS) 114, a device driver 116 or an application(s) (App(s)) 118. For these examples, host computing platform 110 may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

According to some examples, as shown in FIG. 1, host interface 120 at NVDIMM 105 may include a system management bus (SMBus) interface 122 and a memory interface 124. SMBus interface 122 may be designed or operated in compliance with one or more standards or specifications (including progenies or variants) to include the SMBus Specification, version 2.0, published in August 2000 ("SMBus Specification"). As described more below, elements of host computing platform 110 may communicate with NVDIMM controller 130 through SMBus interface 122. Also, elements of computing platform 110 may have access to volatile memory 150 through memory interface 124 over control channel 127 through control switch 140 and then over control channel 147. In some examples, access to volatile memory 150 may be switched by control switch 140 to NVDIMM controller 130 over control channel 137 to save or restore contents of volatile memory 150 from or to non-volatile memory 160 using memory channel 155 coupled between volatile memory 150 and non-volatile memory 160.

According to some examples, as shown in FIG. 1, NVDIMM controller 130 may include registers 132 and circuitry 134. Circuitry 134 may be capable of executing components or features to receive a status request from elements of host computing platform 110. As described more below, the status request may pertain to a status of NVDIMM controller 130 or other elements of NVDIMM 105 (e.g., non-volatile memory 160). The components or features may also be capable of determining a status responsive to the status request and then indicate that status via selective assertion of bits maintained in registers 132 based on a register map. The requesting element of host computing platform 110 such as device driver 116 (requestor) may have access to registers 132 through SMBus interface 122 and over communication link 125 to determine which bits have been asserted. The requestor may then use the register map to determine what status was indicated by the components or features implemented by circuitry 134.

In some examples, volatile memory 150 may include volatile memory designed or operated in compliance with one or more standards or specifications (including progenies or variants) associated with various types of volatile memory such as DRAM. For example, types of DRAM such as synchronous double data rate DRAM (DDR DRAM) may be included in volatile memory 150 and standards or specifications associated with DDR DRAM may include those published by the JEDEC Solid State Technology Association ("JEDEC") for various generations of DDR such as DDR2, DDR3, DDR4 or future DDR generations. Some example standards or specifications may include, but are not limited to, JESD79-3F—"DDR3 SDRAM Standard", published in July 2012 or JESD79-4—"DDR4 SDRAM Standard", published in September 2012.

According to some examples, non-volatile memory 160 may include one or more types of non-volatile memory to include, but not limited to, NAND flash memory, NOR flash memory, 3-D cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory or nanowire. Also, in some examples, non-volatile memory 160 may include enough memory capacity to receive the full contents of volatile memory 150 or possibly multiple copies of contents of volatile memory 150. For these examples, non-volatile memory 160 sized for multiple copies may allow for images of time-based data maintained in volatile memory 150 to be saved to regions of non-volatile memory 160. As described more below, global unique identifiers (GUIDs) may be assigned or associated with data to be saved or restored from a non-volatile memory such as non-volatile memory 160. NVDIMM controller 130 may use these assigned GUIDs to facilitate saving or restoring time-based data from or to volatile memory 150.

In some examples, capacitor pack 170 may include one or more capacitors to provide at least temporary power to NVDIMM 105 via power link 177. The one or more capacitors may be capable of storing enough energy to power NVDIMM 105 for a sufficient time for NVDIMM controller 130 to cause data maintained in volatile memory 150 to be saved to non-volatile memory 160 if a sudden power failure or system reset caused the main power supply to NVDIMM 105 to be cut or shut off. The saving of the data contents to non-volatile memory 160 due to the sudden power failure or system reset may be referred to as a "catastrophic save".

FIG. 2 illustrates a first example register map portion. In some examples, as shown in FIG. 2, the first example register map portion includes register map portion 200. In some examples, elements of a system such as system 100 shown in FIG. 1 may use register map portion 200 to communicate or exchange information with an NVDIMM controller for an NVDIMM such as NVDIMM controller 130 for NVDIMM 105. For these examples, selective assertion of various sets of bits maintained in corresponding sets of registers (e.g., maintained with registers 132) may be based, at least in part, on register map portion 200. Also, elements of the system may have read-only (RO) or read/write (RW) access to the registers through an SMBus interface such as SMBus interface 122. Examples are not limited to elements of a system such as system 100 shown in FIG. 1, other elements of a computing platform (e.g., an operating system) may also use register map portion 200 to communicate with the NVDIMM controller.

According to some examples, register map portion 200 may be associated with a header. The header, for example, may be used to indicate capabilities and/or operating parameters of an NVDIMM and/or an NVDIMM controller. The header may also include information to interpret one or more other portions of an entire register map for use to communicate requests or commands to the NVDIMM controller. As shown in FIG. 2, various sets of bits may be associated with corresponding field names having specified offsets, lengths (in bytes) and access rights such a read/write (RW) or read-only (RO) from the perspective of elements of the host computing platform (requestor). A description is also shown in FIG. 2 for each sets of bits that may be selectively asserted either individually (e.g., a single bit) or in a group (e.g., multiple bits).

In some examples, as shown in FIG. 2, PAGE_NUM has an offset value of 0x00 (hexadecimal), a length of 1 and a RW access. For these examples, the bits in the PAGE_NUM field are the only bits in register map portion 200 that has RW access to allow a requestor to indicate a page number in BIT[2:0], maximum number of pages in BIT[5:0] and reserves BIT[7:6] for possible future changes.

According to some examples, as shown in FIG. 2, the fields associated with offsets 0x01 to 0x03 indicate hardware and firmware revision information, respectively. The fields associated with offsets 0x04 to 0x19 may be used to indicate operating parameters associated with elements of the NVDIMM such as the NVDIMM controller, non-volatile memory, volatile memory and capacitor package.

In some examples, the Number of SAVE regions field may specify the number of SAVE regions in the NVDIMM for saving multiple copies of the volatile memory (DRAM) contents at various points of time. For these examples, the NVDIMM may be capable of supporting at least one region (e.g., identified as REGION-0). In other words, the non-volatile memory (e.g., NAND flash) may have a memory capacity large enough to save a copy of all the contents of the DRAM in the at least one region. Also, the SAVE Latency and RESTORE Latency indicated at offsets 0x08 and 0x0A may indicate the respective worst case SAVE latency in seconds (secs) and RESTORE latency in secs for REGION-0. The worst case SAVE and RESTORE latencies may take into consideration write or read latencies primarily associated with the non-volatile memory.

FIG. 3 illustrates a second example register map portion. In some examples, as shown in FIG. 3, the second example register map portion includes register map portion 300. In some examples, elements of a system such as system 100 shown in FIG. 1 may use register map portion 300 to communicate or exchange information with an NVDIMM controller for an NVDIMM. For these examples, selective assertion of various sets of bits maintained in corresponding sets of registers may be based, at least in part, on register map portion 300. As mentioned previously, elements of the system may have RO or RW access to the registers through an SMBus interface. Examples are not limited to elements of a system such as system 100 shown in FIG. 1, other elements of a computing platform may also use register map portion 300 to communicate or exchange information with the NVDIMM controller.

According to some examples, register portion 300 may be associated with an NVDIMM STATE class of requests received by the NVDIMM controller from elements of the host computing platform (requestor) to receive a status of the NVDIMM. For these examples, as shown in FIG. 3, the bits in the GET_NVDIMM_STATE field are the only bits in register map portion 300 that has RW access to allow a requestor to indicate a request associated with an NVDIMM status or state.

In some examples, BIT7 of the GET_NVDIMM_STATE field may be cleared (e.g., de-asserts the bit) by the requestor while issuing this request. For these examples, the NVDIMM controller sets (e.g., asserts) BIT7 to indicate the request has been accepted and bits associated with the T(NvState.SV) field shown in FIG. 3 have been populated or selectively asserted. The bits selectively asserted for T(NvState.SV) may indicate a time-out in either milliseconds (ms) or secs for the requestor to wait for the NVDIMM controller to complete the request.

According to some examples, BIT6 of the GET_NVDIMM_STATE field may be cleared while the requestor is issuing this request. For these examples, the NVDIMM controller sets BIT6 to indicate this request has been completed and NVDIMM status is indicated by selective assertion of bits associated with the NVDIMM_STATUS field based on register map portion 300. In some examples, if BIT0 is set or asserted in the NVDIMM_STATUS field, this may indicate that the NVDIMM controller is busy executing a previously received command (e.g., such as a SAVE, ERASE or RESTORE. However, the NVDIMM may still receive a new request or command and queue that new request or command for execution after completing the previous request or command.

In some examples, the BUSY_TIMEOUT T(Busy) may indicate a time-out in either ms or secs for a requestor to wait for the NVDIMM controller to no longer be busy before determining that the NVDIMM controller is locked-up or malfunctioning. For these examples, the NVDIMM controller may populate or selectively assert the bits associated with this field before setting the corresponding NVDIMM_STATUS.BUSY bit (e.g., BIT0 of the NVDIMM_STATUS field). The NVDIMM controller may update the BUSY_TIMEOUT T(Busy) field each time a GET_NVDIMM_STATUS request is received from the requestor.

FIG. 4 illustrates a third example register map portion. In some examples, as shown in FIG. 4, the third example register map portion includes register map portion 400. In some examples, elements of a system such as system 100 shown in FIG. 1 may use register map portion 400 to communicate or exchange information with an NVDIMM controller for an NVDIMM. For these examples, selective assertion of various sets of bits maintained in corresponding sets of registers may be based, at least in part, on register map portion 400. As mentioned previously, elements of the system may have RO or RW access to the registers through an SMBus interface. Examples are not limited to elements of a system such as system 100 shown in FIG. 1, other elements of a computing platform may also use register map portion 400 to communicate or exchange information with the NVDIMM controller.

According to some examples, register portion 400 may be associated with a SAVE class of commands received by the NVDIMM controller from elements of the host computing platform (requestor) to cause the NVDIMM controller to save contents stored in the volatile memory to the non-volatile memory. For these examples, as shown in FIG. 4, the bits in the SAVE_CMD and ABORT_SAVE fields in register map portion 400 both have RW access to allow a requestor to indicate a command either to execute a SAVE operation or ABORT a SAVE operation. Also, the SAVE_IMAGE_GUID field may allow for RW access for a requestor to indicate a global unique identifier (GUID) for an image or content to save to the non-volatile memory.

In some examples, BIT7 of the SAVE_CMD field may be cleared by the requestor while issuing this command. For these examples, the NVDIMM controller sets BIT7 to indicate the command has been accepted and bits associated with the T(Save.SV) field shown in FIG. 4 have been populated or selectively asserted. The bits selectively asserted for T(Save.SV) may indicate a time-out in either ms or secs for the requestor to wait for the NVDIMM controller to complete the SAVE command.

According to some examples, BIT6 of the SAVE_CMD field may be cleared while the requestor is issuing this command. For these examples, the NVDIMM controller sets BIT6 to indicate this command has been completed and a SAVE operation status is indicated by selective assertion of bits associated with the SAVE_STATUS field based on register map portion 400.

In some examples, BIT5 of the SAVE_CMD field may be asserted to indicate whether a valid image GUID has been associated with the content to be saved to the non-volatile memory as indicated in bits selectively asserted in the SAVE_IMAGE_GUID fields. For these examples, the requestor may have indicated a GUID in the SAVE_IMAGE_GUID for the NVDIMM controller to associate with content to be saved to the non-volatile memory. If the GUID is valid (e.g., doesn't match a previously associated GUID for another image) BIT5 may be asserted and the NVDIMM controller may save the image/contents to an available region of the non-volatile memory. The NVDIMM controller may preserve the association between the GUID and the region saved, until an ERASE command is issued to this GUID. If GUID is not valid, BIT5 is not asserted and the contents may be saved to a default region of the non-volatile memory (e.g., REGION-0).

In some examples, BIT7 of the ABORT_SAVE field may be cleared by the requestor while issuing this command. For these examples, the NVDIMM controller sets BIT 7 to indicate the command has been accepted and bits associated with the T(Save.SV) field shown in FIG. 4 have been populated or selectively asserted. The bits selectively asserted for T(Save.SV) may indicate a time-out in either ms or secs for the requestor to wait for the NVDIMM controller to complete the ABORT_SAVE command.

According to some examples, BIT6 of the ABORT_SAVE field may be cleared while the requestor is issuing this command. For these examples, the NVDIMM controller sets BIT6 to indicate this command has been completed and an ABORT SAVE operation status is indicated by selective assertion of bits associated with the SAVE_STATUS field based on register map portion 400.

In some examples, BIT5 of the ABORT_SAVE field may be asserted to indicate whether a valid image GUID has been associated with the content for aborting the SAVE operation to the non-volatile memory as indicated in bits selectively asserted in the SAVE_IMAGE_GUID fields. If the GUID is valid (e.g., doesn't match a previously associated GUID for another image) BIT5 may be asserted and the NVDIMM controller may abort the SAVE operation for the image/contents to an available region of the non-volatile memory. If GUID is not valid, BIT5 is not asserted and the NVDIMM controller may abort the SAVE operation for contents to be saved to a default region of the non-volatile memory (e.g., REGION-0).

FIG. 5 illustrates a fourth example register map portion. In some examples, as shown in FIG. 5, the fourth example register map portion includes register map portion 500. In some examples, elements of a system such as system 100 shown in FIG. 1 may use register map portion 500 to communicate or exchange information with an NVDIMM controller for an NVDIMM. For these examples, selective assertion of various sets of bits maintained in corresponding sets of registers may be based, at least in part, on register map portion 500. As mentioned previously, elements of the system may have RO or RW access to the registers through an SMBus interface. Examples are not limited to elements of a system such as system 100 shown in FIG. 1, other elements of a computing platform may also use register map portion 500 to communicate or exchange information with the NVDIMM controller.

According to some examples, register portion 500 may be associated with a RESTORE class of commands received by the NVDIMM controller from elements of the host computing platform (requestor) to cause the NVDIMM controller to RESTORE contents stored in the non-volatile memory to the volatile memory. For these examples, as shown in FIG. 5, the bits in the RESTORE_CMD and ABORT_RESTORE fields in register map portion 500 both have RW access to allow a requestor to indicate a command either to execute a RESTORE operation or ABORT a RESTORE operation. Also, the RESTORE_IMAGE_GUID field may allow for RW access for a requestor to indicate a GUID for an image or content to restore to the volatile memory. The requestor or caller of a RESTORE_CMD or ABORT_RESTORE may setup the image GUID before invoking the command.

In some examples, BIT7 of the RESTORE_CMD field may be cleared by the requestor while issuing this command. For these examples, the NVDIMM controller sets BIT7 to indicate the command has been accepted and bits associated with the T(Restore.SV) field shown in FIG. 5 have been populated or selectively asserted. The bits selectively asserted for T(Restore.SV) may indicate a time-out in either ms or secs for the requestor to wait for the NVDIMM controller to complete the RESTORE command.

According to some examples, BIT6 of the RESTORE_CMD field may be cleared while the requestor is issuing this command. For these examples, the NVDIMM controller sets BIT6 to indicate this command has been completed and a RESTORE operation status is indicated by selective assertion of bits associated with the RESTORE_STATUS field based on register map portion 500.

In some examples, BIT5 of the RESTORE_CMD field may be asserted to indicate whether a valid image GUID has been associated with the content to be restored to the volatile memory as indicated in bits selectively asserted in the RESTORE_IMAGE_GUID fields. For these examples, the requestor may have indicated a GUID in the RESTORE_IMAGE_GUID for the NVDIMM controller to associate with content to be restored to the volatile memory. If the GUID is valid (matches a previously associated GUID) BIT5 may be asserted and the NVDIMM controller may restore the image/contents to the volatile memory. If GUID is not valid, BIT5 is not asserted and the contents may be restored from a default region of the non-volatile memory (e.g., REGION-0) to the volatile memory.

In some examples, BIT7 of the ABORT_RESTORE field may be cleared by the requestor while issuing this command. For these examples, the NVDIMM controller sets BIT7 to indicate the command has been accepted and bits associated with the T(RESTORE.SV) field shown in FIG. 5 have been populated or selectively asserted. The bits selectively asserted for T(RESTORE.SV) may indicate a time-out in either ms or secs for the requestor to wait for the NVDIMM controller to complete the ABORT_RESTORE command.

According to some examples, BIT6 of the ABORT_RESTORE field may be cleared while the requestor is issuing this command. For these examples, the NVDIMM controller sets BIT6 to indicate this command has been completed and an ABORT RESTORE operation status is indicated by selective assertion of bits associated with the RESTORE_STATUS field based on register map portion 500.

In some examples, BIT5 of the ABORT_RESTORE field may be asserted to indicate whether a valid image GUID has been associated with the content for aborting the RESTORE operation to the volatile memory as indicated in bits selectively asserted in the RESTORE_IMAGE_GUID fields. If the GUID is valid (matches a previously associated GUID) BIT5 may be asserted and the NVDIMM controller may abort the restore operation for the image/contents to the volatile memory. If GUID is not valid, BIT5 is not asserted and the restore operation for the contents being restored from a default region of the non-volatile memory (e.g., REGION-0) to the volatile memory is aborted.

FIG. 6 illustrates a fifth example register map portion. In some examples, as shown in FIG. 6, the fifth example register map portion includes register map portion 600. In some examples, elements of a system such as system 100 shown in FIG. 1 may use register map portion 600 to communicate or exchange information with an NVDIMM controller for an NVDIMM. For these examples, selective assertion of various sets of bits maintained in corresponding sets of registers may be based, at least in part, on register map portion 600. As mentioned previously, elements of the system may have RO or RW access to the registers through an SMBus interface. Examples are not limited to elements of a system such as system 100 shown in FIG. 1, other elements of a computing platform may also use register map portion 600 to communicate or exchange information with the NVDIMM controller.

According to some examples, register portion 600 may be associated with an ERASE class of commands received by the NVDIMM controller from elements of the host computing platform (requestor) to cause the NVDIMM controller to ERASE contents stored in the non-volatile memory. For these examples, as shown in FIG. 6, the bits in the ERASE_CMD and ABORT_ERASE fields in register map portion 600 both have RW access to allow a requestor to indicate a command either to execute an ERASE operation or ABORT an ERASE operation. Also, the ERASE_IMAGE_GUID field may allow for RW access for a requestor to indicate a GUID for an image or content to erase from the non-volatile memory.

In some examples, BIT7 of the ERASE_CMD field may be cleared by the requestor while issuing this command. For these examples, the NVDIMM controller sets BIT7 to indicate the command has been accepted and bits associated with the T(Erase.SV) field shown in FIG. 6 have been populated or selectively asserted. The bits selectively asserted for T(Erase.SV) may indicate a time-out in either ms or secs for the requestor to wait for the NVDIMM controller to complete the ERASE command.

According to some examples, BIT6 of the ERASE_CMD field may be cleared while the requestor is issuing this command. For these examples, the NVDIMM controller sets BIT6 to indicate this command has been completed and an ERASE operation status is indicated by selective assertion of bits associated with the ERASE_STATUS field based on register map portion 600.

In some examples, BIT5 of the ERASE_CMD field may be asserted to indicate whether a valid image GUID has been associated with the content to be erased from the non-volatile memory as indicated in bits selectively asserted in the ERASE_IMAGE_GUID fields. For these examples, the requestor may have indicated a GUID in the ERASE_IMAGE_GUID for the NVDIMM controller to determine what content and/or regions to erase from the non-volatile memory. If the GUID is valid (e.g., matches a previously associated GUID) BIT5 may be asserted and the NVDIMM controller may ERASE the image/contents from the region of the non-volatile memory associated with the valid GUID. If GUID is not valid, BIT5 is not asserted and the contents may be erased from a default region of the non-volatile memory (e.g., REGION-0).

In some examples, BIT7 of the ABORT_ERASE field may be cleared by the requestor while issuing this command. For these examples, the NVDIMM controller sets BIT 7 to indicate the command has been accepted and bits associated with the T(Erase.SV) field shown in FIG. 6 have been populated or selectively asserted. The bits selectively asserted for T(Erase.SV) may indicate a time-out in either ms or secs for the requestor to wait for the NVDIMM controller to complete the ABORT_ERASE command.

According to some examples, BIT6 of the ABORT_ERASE field may be cleared while the requestor is issuing this command. For these examples, the NVDIMM controller sets BIT6 to indicate this command has been completed and an ABORT ERASE operation status is indicated by selective assertion of bits associated with the ERASE_STATUS field based on register map portion 600.

In some examples, BIT5 of the ABORT_ERASE field may be asserted to indicate whether a valid image GUID has been associated with the content for aborting the ERASE operation to the non-volatile memory as indicated in bits selectively asserted in the SAVE_IMAGE_GUID fields. If the GUID is valid (e.g., matches a previously associated GUID) BIT5 may be asserted and the NVDIMM controller may abort the ERASE operation for the image/contents to the region of the non-volatile memory associated with the valid GUID. If GUID is not valid, BIT5 is not asserted and the NVDIMM controller may abort the ERASE operation for contents to be erased from a default region of the non-volatile memory (e.g., REGION-0).

FIG. 7 illustrates a sixth example register map portion. In some examples, as shown in FIG. 7, the sixth example register map portion includes register map portion 700. In some examples, elements of a system such as system 100 shown in FIG. 1 may use register map portion 700 to communicate or exchange information with an NVDIMM controller for an NVDIMM. For these examples, selective assertion of various sets of bits maintained in corresponding sets of registers may be based, at least in part, on register map portion 700. As mentioned previously, elements of the system may have RO or RW access to the registers through an SMBus interface. Examples are not limited to elements of a system such as system 100 shown in FIG. 1, other elements of a computing platform may also use register map portion 700 to communicate or exchange information with the NVDIMM controller.

According to some examples, register portion 700 may be associated with ARM/DISARM class of commands received by the NVDIMM controller from elements of the host computing platform (requestor) to cause the NVDIMM controller to enable catastrophic save capabilities of the NVDIMM in order to save contents stored in the volatile memory to the non-volatile memory based on a power loss or unexpected system reset. Enabling catastrophic save capabilities may be referred to as an ARM operation as it may cause one or more capacitors coupled to the NVDIMM to start storing energy or "arming" for a catastrophic save event. For these examples, as shown in FIG. 7, the bits in the ENABLE_CATASTROPHIC_SAVE and DISABLE_CATASTROPHIC_SAVE fields in register map portion 700 both have RW access to allow a requestor to indicate a command either to execute an ARM operation or disable an ARM operation.

In some examples, BIT7 of the ENABLE_ CATASTROPHIC_SAVE field may be cleared by the requestor while issuing this command. For these examples, the NVDIMM controller sets BIT7 to indicate the command has been accepted and bits associated with the T(Arm.SV) field shown in FIG. 7 have been populated or selectively asserted. The bits selectively asserted for T(Arm.SV) may indicate a time-out in either ms or secs for the requestor to wait for the NVDIMM controller to complete the ENABLE_ CATASTROPHIC_SAVE or ARM command.

According to some examples, BIT6 of the ENABLE_CATASTROPHIC_SAVE field may be cleared while the requestor is issuing this command. For these examples, the NVDIMM controller sets BIT6 to indicate this command has been completed and an ARM operation status is indicated by selective assertion of bits associated with the CATASTROPHIC_SAVE_STATUS field based on register map portion 700.

In some examples, BIT7 of the DISABLE_ CATASTROPHIC_SAVE field may be cleared by the requestor while issuing this command. For these examples, the NVDIMM controller sets BIT7 to indicate the command has been accepted and bits associated with the T(Arm.SV) field shown in FIG. 7 have been populated or selectively asserted. The bits selectively asserted for T(Arm.SV) may indicate a time-out in either ms or secs for the requestor to wait for the NVDIMM controller to complete the DISABLE_CATASTROPHIC_SAVE or DISARM command.

According to some examples, BIT6 of the DISABLE_CATASTROPHIC_SAVE field may be cleared while the requestor is issuing this command. For these examples, the NVDIMM controller sets BIT6 to indicate this command has been completed and a DISARM operation status is indicated by selective assertion of bits associated with the CATASTROPHIC_SAVE_STATUS field based on register map portion 700.

FIG. 8 illustrates a seventh example register map portion. In some examples, as shown in FIG. 8, the seventh example register map portion includes register map portion 800. In some examples, elements of a system such as system 100 shown in FIG. 1 may use register map portion 800 to communicate or exchange information with an NVDIMM controller for an NVDIMM. For these examples, selective assertion of various sets of bits maintained in corresponding sets of registers may be based, at least in part, on register map portion 800. As mentioned previously, elements of the system may have RO or RW access to the registers through an SMBus interface. Examples are not limited to elements of a system such as system 100 shown in FIG. 1, other elements of a computing platform may also use register map portion 800 to communicate or exchange information with the NVDIMM controller.

According to some examples, register portion 800 may be associated with a self-refresh save class of commands received by the NVDIMM controller from elements of the host computing platform (requestor) to cause the NVDIMM controller to save on self-refresh (e.g., initiate volatile to non-volatile copy on the volatile memory going to a self-refresh mode). For these examples, as shown in FIG. 8, the bits in the ENABLE_SELFREFRESH_SAVE and DISABLE_SELFREFRESH_SAVE fields in register map portion 800 both have RW access to allow a requestor to indicate a command either to execute a self-refresh save operation or disable a self-refresh save operation.

In some examples, BIT7 of the ENABLE_SELFREFRESH_SAVE field may be cleared by the requestor while issuing this command. For these examples, the NVDIMM controller sets BIT7 to indicate the command has been accepted and bits associated with the T(SrSave.SV) field shown in FIG. 8 have been populated or selectively asserted. The bits selectively asserted for T(SrSave.SV) may indicate a time-out in either ms or secs for the requestor to wait for the NVDIMM controller to complete the ENABLE_SELFREFRESH_SAVE command.

According to some examples, BIT6 of the ENABLE_SELFREFRESH_SAVE field may be cleared while the requestor is issuing this command. For these examples, the NVDIMM controller sets BIT6 to indicate this command has been completed and a self-refresh save operation status is indicated by selective assertion of bits associated with the SR_SAVE STATUS field based on register map portion 800.

In some examples, BIT7 of the DISABLE_SELFREFRESH_SAVE field may be cleared by the requestor while issuing this command. For these examples, the NVDIMM controller sets BIT7 to indicate the command has been accepted and bits associated with the T(SrSave.SV) field shown in FIG. 7 have been populated or selectively asserted. The bits selectively asserted for T(SrSave.SV) may indicate a time-out in either ms or secs for the requestor to wait for the NVDIMM controller to complete the DISABLE_SELFREFRESH_SAVE command.

According to some examples, BIT6 of the DISABLE_SELFREFRESH_SAVE field may be cleared while the requestor is issuing this command. For these examples, the NVDIMM controller sets BIT6 to indicate this command has been completed and a disable self-refresh save operation status is indicated by selective assertion of bits associated with the SRSAVE_STATUS field based on register map portion 800.

FIG. 9 illustrates an eighth example register map portion. In some examples, as shown in FIG. 3, the eighth example register map portion includes register map portion 900. In some examples, elements of a system such as system 100 shown in FIG. 1 may use register map portion 900 to communicate or exchange information with an NVDIMM controller for an NVDIMM. For these examples, selective assertion of various sets of bits maintained in corresponding sets of registers may be based, at least in part, on register map portion 900. As mentioned previously, elements of the system may have RO or RW access to the registers through an SMBus interface. Examples are not limited to elements of a system such as system 100 shown in FIG. 1, other elements of a computing platform may also use register map portion 900 to communicate or exchange information with the NVDIMM controller.

According to some examples, register portion 900 may be associated with a Heath Check class of requests received by the NVDIMM controller from elements of the host computing platform (requestor) to receive a health status of the NVDIMM and or elements of the NVDIMM. For these examples, as shown in FIG. 9, the bits in the GET_HEALTH_STATUS field are the only bits in register map portion 900 that has RW access to allow a requestor to indicate a request associated with a get health status operation.

In some examples, BIT7 of the GET_HEALTH_STATUS field may be cleared or de-asserted by the requestor while issuing this request. For these examples, the NVDIMM controller sets or asserts BIT7 to indicate the request has been accepted and bits associated with the T(Health.SV) field shown in FIG. 9 have been populated or selectively asserted. The bits selectively asserted for T(Health.SV) may indicate a time-out in either ms or secs for the requestor to wait for the NVDIMM controller to complete the GET_HEALTH_STATUS request.

According to some examples, BIT6 of the GET_HEALTH_STATUS field may be cleared while the requestor is issuing this request. For these examples, the NVDIMM controller sets BIT6 to indicate this request has been completed and health status is indicated by selective assertion of bits associated with the HEALTH_STATUS field based on register map portion 900.

Figure 10:
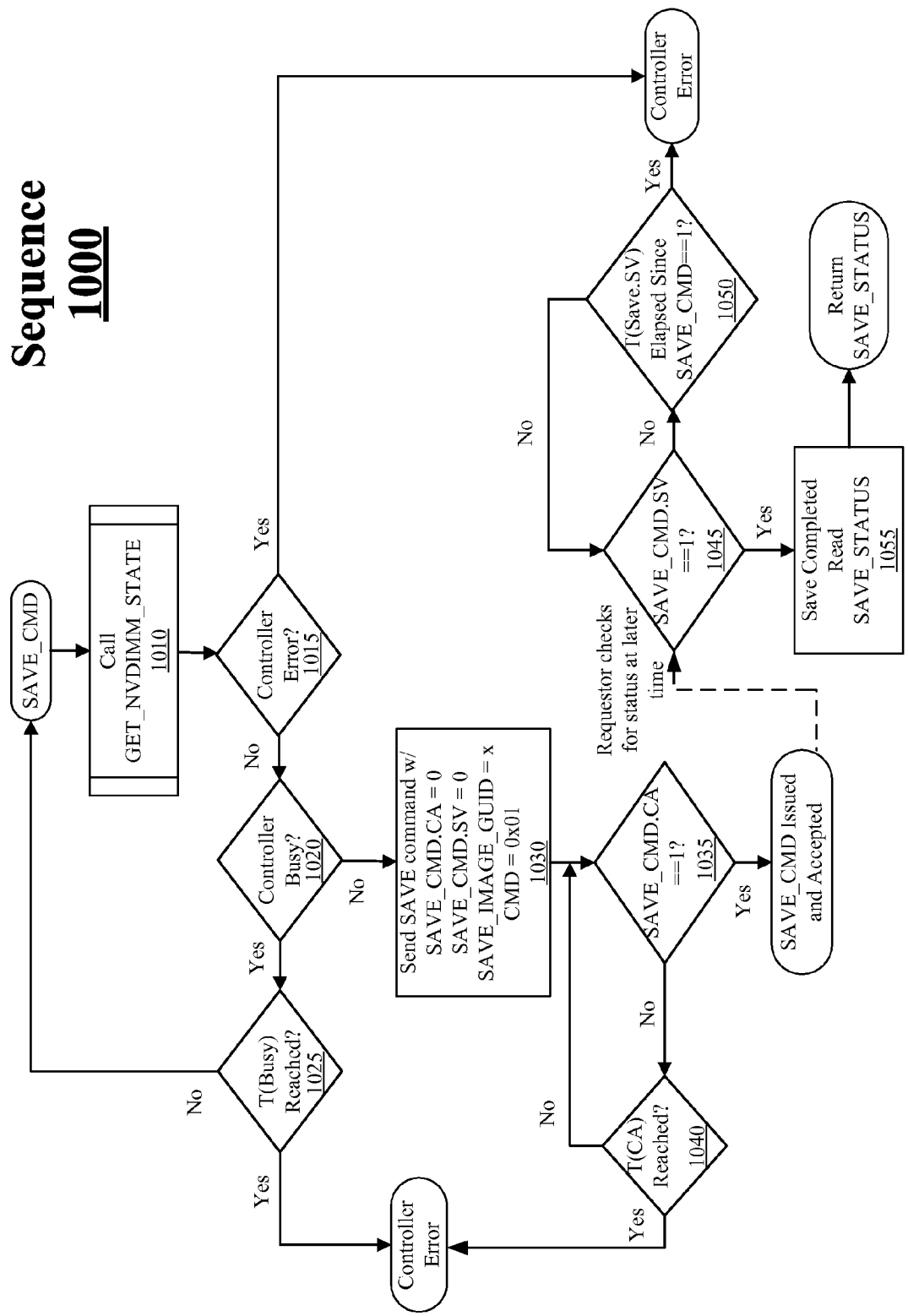
FIG. 10 illustrates a first example sequence.

FIG. 10 illustrates a first example sequence. In some examples, as shown in FIG. 10, the first example sequence includes sequence 1000. In some examples, elements of a system such as system 100 shown in FIG. 1 may implement sequence 1000 to issue a SAVE_CMD using a register map such as register map portions 200, 300 or 400 shown in FIGS. 2-4. For these examples, the elements of system 100 such as BIOS 114, device drive 116 or App(s) 118 may cause the SAVE_CMD to be issued to NVDIMM controller 130 by accessing registers 132 through SMBus interface 122. Examples are not limited to elements of a system such as system 100 shown in FIG. 1, other elements of a host computing platform (e.g., an operating system) may also use register map portions 200, 300 or 400 to communicate with NVDIMM controller 130. Also, other example portions of a register map may be used to issue a SAVE_CMD.

Figure 11:
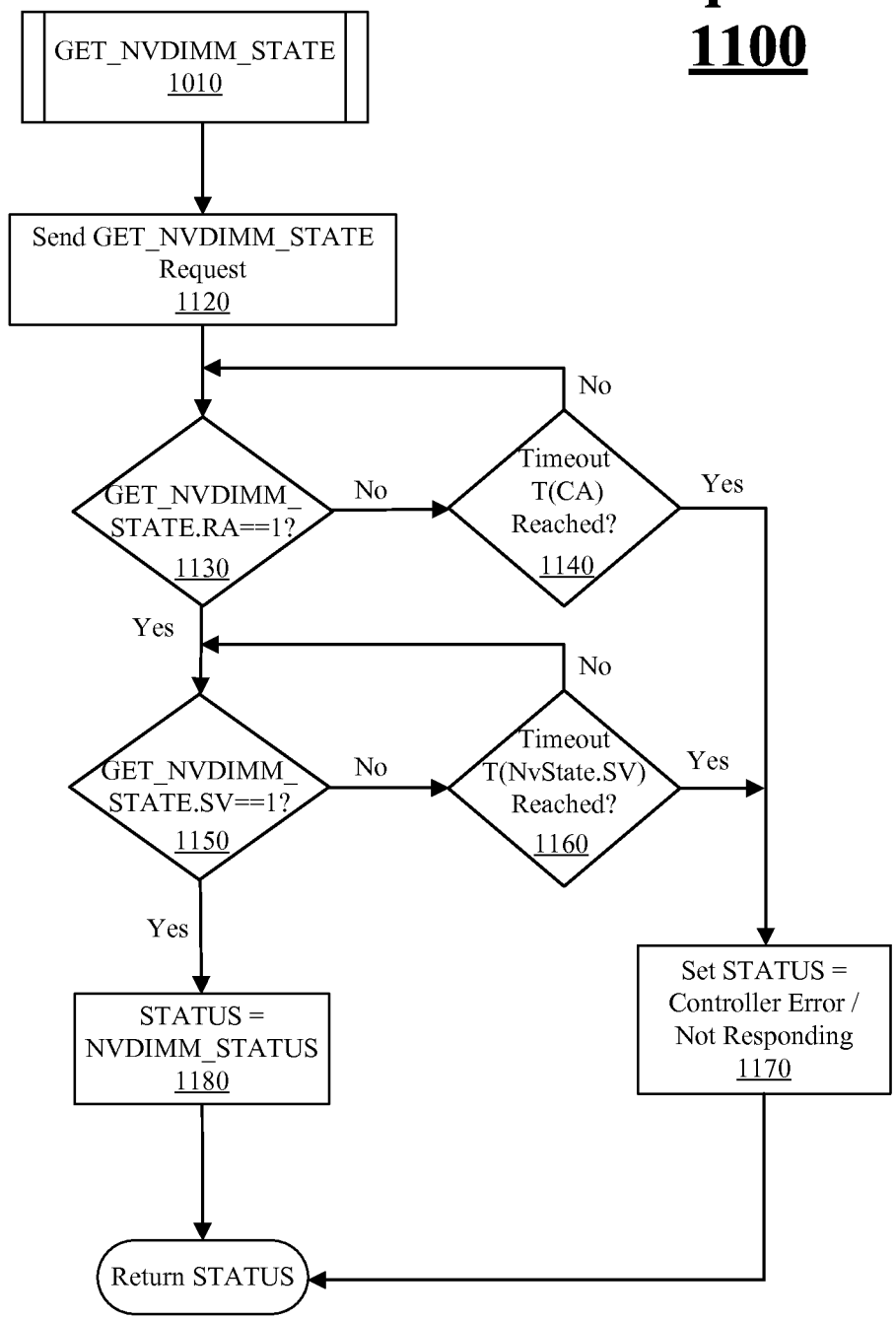
FIG. 11 illustrates a second example sequence.

Starting with a SAVE_CMD and moving to block 1010 (Call GET_NVDIMM_STATE), logic and/or features at host computing platform 110 such as device driver 116 may first place a request for the status of NVDIMM controller 130 by clearing both BIT7 and BIT6 in the GET_NVDIMM_STATE field as indicated in register map portion 300. In some examples, sequence 1100 as shown in FIG. 11 below may be implemented to receive a status from NVDIMM controller 130.

Proceeding from block 1010 to decision block 1015 (Controller Error?), device driver 116, based on sequence 1100 (described more below) may either receive the status of NVDIMM controller 130 or may determine that a controller error has occurred. If a controller error was determined, the process comes to an end. Otherwise the process moves to decision block 1020.

Moving from decision block 1015 to decision block 1020 (Controller Busy?), device driver 116 may determine whether BIT0 of the NVDIMM_STATUS field of register map portion 300 is asserted. If asserted, the process moves to decision block 1025. Otherwise, the process moves to block 1030.

Moving from decision block 1020 to decision block 1025 (T(Busy) Reached?), device driver 116 may determine whether a time-out value indicated in BIT[14:0] of the BUSY-TIMOUT T(Busy) field of register map portion 300 has been exceeded. If the time-out value has not been exceeded another SAVE_CMD may be initiated by device driver 116 that causes another request for a status of NVDIMM controller 130. If the time-out value has been exceeded, a controller error is determined and the process comes to an end.

Moving from decision block 1020 to block 1030 (Send SAVE command w/ SAVE_CMD.CA=0 SAVE_CMD.SV=0 SAVE_IMAGE_GUID=x CMD=0x01), device driver 116 may de-assert or clear BIT7 and BIT6 of the SAVE_CMD field of register map portion 400 to result in SAVE_CMD.CA=0 and SAVE_CMD.SV=0. Device driver 116 may also selectively assert bits in SAVE_IMAGE_GUID to provide a GUID for an image or contents of volatile memory 150 to save to non-volatile memory 160. Device driver 116 may also selectively assert bits in BIT[4:0] of the SAVE_CMD field to indicate a command to start the SAVE operation.

Proceeding from block 1030 to decision block 1035 (SAVE_CMD.CA==1?), device driver 116 may check BIT7 of the SAVE_CMD field to determine whether NVDIMM controller 130 has accepted the SAVE command. If BIT7 has been asserted, the SAVE_CMD has been issued and accepted by NVDIMM controller 130. Device driver 116 may then check BIT6 of the SAVE_CMD field at a later time and the process moves to decision block 1045. If BIT7 has not been asserted, the process moves to decision block 1040.

Moving from decision block 1035 to decision block 1040 (T(CA) Reached), device driver 116 may determine whether a wait time for receiving a command acceptance indication for the SAVE command has exceeded a time-out value indicated in BIT[14:0] of the Command Accepted Latency T(CA) field of register map portion 200. If the wait time has exceeded the time-out value, a controller error is determined and the process comes to an end. If the wait time does not exceed the time-out value, device driver 116 may check BIT7 repeatedly until either the wait time exceeds the time-out value or NVDIMM controller 130 indicates acceptance of the SAVE command by asserting BIT7.

Moving from decision block 1035 to decision block 1045 (SAVE_CMD.SV==1?), device driver 116 may check BIT6 of the SAVE_CMD field to determine whether NVDIMM controller 130 has completed the SAVE command. If BIT6 has not been asserted the process moves to block 1055. Otherwise, the process moves to decision block 1050.

Moving from decision block 1045 to decision block 1050 (T(Save.SV) Elapsed Since SAVE_CMD==1?), device driver 116 may determine whether a wait time for receiving a command completion indication for the SAVE command has exceeded a time-out value indicated in BIT[14:0] of the T(Save.SV) field of register map portion 400. If the wait time has exceeded the time-out value, a controller error is determined and the process comes to an end. If the wait time does not exceed the time-out value, device driver 116 may check BIT6 repeatedly until either the wait time exceeds the time-out value or NVDIMM controller 130 indicates completion of the SAVE command by asserting BIT6.

Moving from decision block 1045 to block 1055 (Save Completed Read SAVE_STATUS), device driver 116 may read SAVE_STATUS indicated by the bits in the SAVE_STATUS field of register map portion 400 that may have been selectively asserted by NVDIMM controller 130 to indicate the status of the completed SAVE operation. In some examples, as shown in FIG. 10 a SAVE_STATUS may be returned to device driver 116 or to an operating system or software (e.g., App(s) 118) of host computing platform 110 based on that indicated status. The process then comes to an end.

FIG. 11 illustrates a second example sequence. In some examples, as shown in FIG. 11, the second example sequence includes sequence 1100. As mentioned above, sequence 1100 may be implemented by device driver 116 to receive a status from NVDIMM controller 130. Examples are not limited to device driver 116 implementing sequence 1100. Other elements of a host computing platform may implement sequence 1110 to receive a status from NVDIMM controller 130. Also, sequence 1100 is not limited to obtaining a status from an NVDIMM controller for a SAVE command. Other command or request classes such as RESTORE, ERASE, ARM/DISARM, Self-Refresh Save or Health Check may also implement sequence 1110 to obtain a status from the NVDIMM controller prior to issuing a command to the NVDIMM controller.

Starting with block 1010 from sequence 1000 (GET_NVDIMM_STATE), device driver 116 may initiate the process of requesting a status from NVDIMM controller 130.

Proceeding from bloc 1010 to block 1120 (Send GET_NVDIMM_STATE Request), device driver 116 may send a request for the status of NVDIMM controller 130 by clearing both BIT7 and BIT6 in the GET_NVDIMM_STATE field as indicated in register map portion 300.

Proceeding from block 1120 to decision block 1130 (GET_NVDIMM_STATE.RA==1?), device driver may check BIT7 of the GET_NVDIMM_STATE field of register map portion 300 to determine whether NVDIMM controller 130 has accepted the request for a status from NVDIMM controller 130. If BIT7 has been asserted, the process moves to decision block 1150. Otherwise, the process moves to decision block 1140.

Moving from decision block 1130 to decision block 1140 (Timeout T(CA) Reached?), device driver 116 may wait a period of time for an indication from NVDIMM controller 130 that the request has been accepted (BIT7 in the GET_NVDIMM_STATE field is asserted). In some examples, the period of time device driver 116 may wait may be based on a worst case value indicated in the Command Accepted Latency (T(CA)) field of register map portion 200. If the waiting time period exceeds the worst case value, the Timeout T(CA) has been reached and the process moves to block 1170. If not reached, the process moves back to decision block 1130.

Moving from decision block 1130 to decision block 1150 (GET_NVDIMM_STATE.SV==1?), device driver 116 may check BIT6 of the GET_NVDIMM_STATE field to determine whether NVDIMM controller 130 has completed the request. If BIT6 has not been asserted the process moves to block 1160. Otherwise, the process moves to decision block 1180.

Moving from decision block 1150 to decision block 1160 (Timeout T(NvState.SV Reached?), device driver 116 may determine whether a wait time for receiving a request completion indication for the status request has exceeded a time-out value indicated in BIT[14:0] of the T(NvState.SV) field of register map portion 300. If the wait time has exceeded the time-out value, the process moves to block 1170. If the wait time does not exceed the time-out value, the process moves back to decision block 1150.

Moving from either decision blocks 1140 or 1160 to block 1170 (Set STATUS=Controller Error/Not responding), device driver 116 may determine that NVDIMM controller 130 is in an error state or is not responding. That error or not responding status may be returned to decision block 1015 of sequence 1000 and may result in the end of that sequence due to the error or not responding state of NVDIMM controller 130.

Moving from decision block 1150 to block 1180 (STATUS=NVDIMM_STATUS), device driver 116 may access bits selectively asserted by NVDIMM controller 130 in NVDIMM_STATUS field of register map portion 300 to determine the status of the NVDIMM. That status indicated in these bits may be returned to decision block 1015 of sequence 1000 to continue on with a SAVE command. In other examples, the status indicated in these bits may be returned to other sequences associated with other commands or requests such a RESTORE, ERASE, ARM/DISARM, Self-Refresh Save or Health Check.

Figure 12:
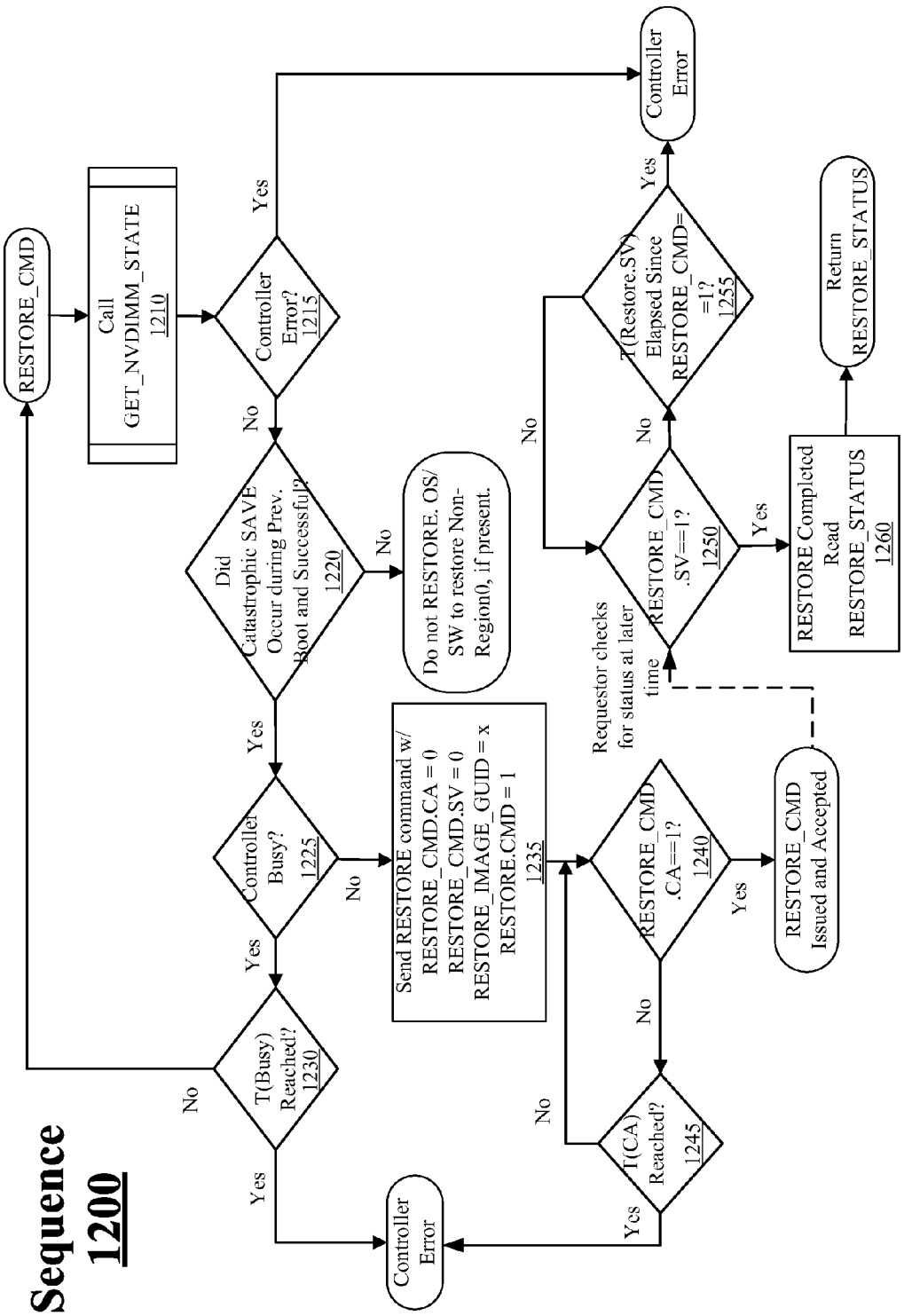
FIG. 12 illustrates a third example sequence.

FIG. 12 illustrates a third example sequence. In some examples, as shown in FIG. 12, the second example sequence includes sequence 1200. In some examples, elements of a system such as system 100 shown in FIG. 1 may implement sequence 1200 to issue a RESTORE_CMD using a register map such as register map portions 200, 300 or 500 shown in FIGS. 2, 3 and 5. For these examples, the elements of system 100 such as BIOS 114, device drive 116 or App(s) 118 may cause the RESTORE_CMD to be issued to NVDIMM controller 130 by accessing registers 132 through SMBus interface 122. Examples are not limited to elements of a system such as system 100 shown in FIG. 1, other elements of a host computing platform (e.g., an operating system) may also use register map portions 200, 300 or 500 to communicate with NVDIMM controller 130. Also, other example portions of a register map may be used to issue a RESTORE_CMD.

Starting with a RESTORE_CMD and moving to block 1210 (Call GET_NVDIMM_STATE), logic and/or features at host computing platform 110 such as BIOS 114 may first place a request for the status of NVDIMM controller 130 by clearing both BIT7 and BIT6 in the GET_NVDIMM_STATE field as indicated in register map portion 300. In some examples, sequence 1100 as shown in FIG. 11 above may be implemented to receive a status from NVDIMM controller 130.

Proceeding from block 1210 to decision block 1215 (Controller Error?), BIOS 114, based on sequence 1100 (described above for FIG. 11) may either receive the status of NVDIMM controller 130 or may determine that a controller error has occurred. If a controller error was determined, the process comes to an end. Otherwise the process moves to decision block 1220.

Moving from decision block 1215 to decision block 1220 (Did Catastrophic SAVE Occur during Previous Boot and Successful?), BIOS 114 may first access BIT7 of the NVDIMM_STATUS field for register map portion 300 to determine whether or not a SAVE# pin was asserted on a previous boot. If BIT7 was asserted, BIOS 114 may then determine whether or not the Catastrophic SAVE operation was successful (BIT8 asserted). If both BIT7 and BIT8 were determined to be asserted the process moves to decision block 1225. If at least one of BIT7 or BIT8 were not asserted, then BIOS 114 will stop the RESTORE command. An operating system or software (e.g., App(s) 118) for host computing platform 110 may then restore Non-Region0 of non-volatile memory 160 (if present) to volatile memory 150 and the RESTORE process may come to an end for BIOS 114.

Moving from decision block 1220 to decision block 1225 (Controller Busy?), BIOS 114 may determine whether BIT0 of the NVDIMM_STATUS field of register map portion 300 is asserted. If asserted, the process moves to decision block 1230. Otherwise, the process moves to block 1235.

Moving from decision block 1225 to decision block 1230 (T(Busy) Reached?), BIOS 114 may determine whether a time-out value indicated in BIT[14:0] of the BUSY-TIMOUT T(Busy) field of register map portion 300 has been exceeded. If the time-out value has not been exceeded another RESTORE_CMD may be initiated by BIOS 114 that causes another request for a status of NVDIMM controller 130. If the time-out value has been exceeded, a controller error is determined and the process comes to an end.

Moving from decision block 1225 to block 1235 (Send RESTORE command w/ RESTORE_CMD.CA=0 RESTORE_CMD.SV=0 RESTORE_IMAGE_GUID=x CMD=0x01), BIOS 114 may de-assert or clear BIT7 and BIT6 of the RESTORE_CMD field of register map portion 500 to result in RESTORE_CMD.CA=0 and RESTORE_CMD.SV=0. BIOS 114 may also selectively assert bits in RESTORE_IMAGE_GUID to provide a GUID for an image or contents of volatile memory 150 to RESTORE from non-volatile memory 160 to volatile memory 150. BIOS 114 may also selectively assert bits in BIT[4:0] of the RESTORE_CMD field to indicate a command to start the RESTORE operation.

Proceeding from block 1235 to decision block 1240 (RESTORE_CMD.CA==1?), BIOS 114 may check BIT7 of the RESTORE_CMD field to determine whether NVDIMM controller 130 has accepted the RESTORE command. If BIT7 has been asserted, the RESTORE_CMD has been issued and accepted by NVDIMM controller 130. BIOS 114 may then check BIT6 of the RESTORE_CMD field at a later time and the process moves to decision block 1250. If BIT7 has not been asserted, the process moves to decision block 1245.

Moving from decision block 1240 to decision block 1245 (T(CA) Reached), BIOS 114 may determine whether a wait time for receiving a command acceptance indication for the SAVE command has exceeded a time-out value indicated in BIT[14:0] of the Command Accepted Latency T(CA) field of register map portion 200. If the wait time has exceeded the time-out value, a controller error is determined and the process comes to an end. If the wait time does not exceed the time-out value, BIOS 114 may check BIT7 repeatedly until either the wait time exceeds the time-out value or NVDIMM controller 130 indicates acceptance of the SAVE command by asserting BIT7.

Moving from decision block 1240 to decision block 1250 (SAVE_CMD.SV==1?), BIOS 114 may check BIT6 of the RESTORE_CMD field to determine whether NVDIMM controller 130 has completed the RESTORE command. If BIT6 has not been asserted the process moves to block 1260. Otherwise, the process moves to decision block 1255.

Moving from decision block 1250 to decision block 1255 (T(Save.SV) Elapsed Since SAVE_CMD==1?), BIOS 114 may determine whether a wait time for receiving a command completion indication for the SAVE command has exceeded a time-out value indicated in BIT[14:0] of the T(Restore.SV) field of register map portion 500. If the wait time has exceeded the time-out value, a controller error is determined and the process comes to an end. If the wait time does not exceed the time-out value, BIOS 114 may check BIT6 repeatedly until either the wait time exceeds the time-out value or NVDIMM controller 130 indicates completion of the RESTORE command by asserting BIT6.

Moving from decision block 1250 to block 1260 (RESTORE Completed Read RESTORE_STATUS), BIOS 114 may read RESTORE_STATUS indicated by the bits in the RESTORE_STATUS field of register map portion 500 that may have been selectively asserted by NVDIMM controller 130 to indicate the status of the completed RESTORE operation. In some examples, as shown in FIG. 12, a RESTORE_STATUS may be returned to BIOS 114 or to an operating system or software (e.g., App(s) 118) of host computing platform 110 based on that indicated status. The process then comes to an end.

Figure 13:
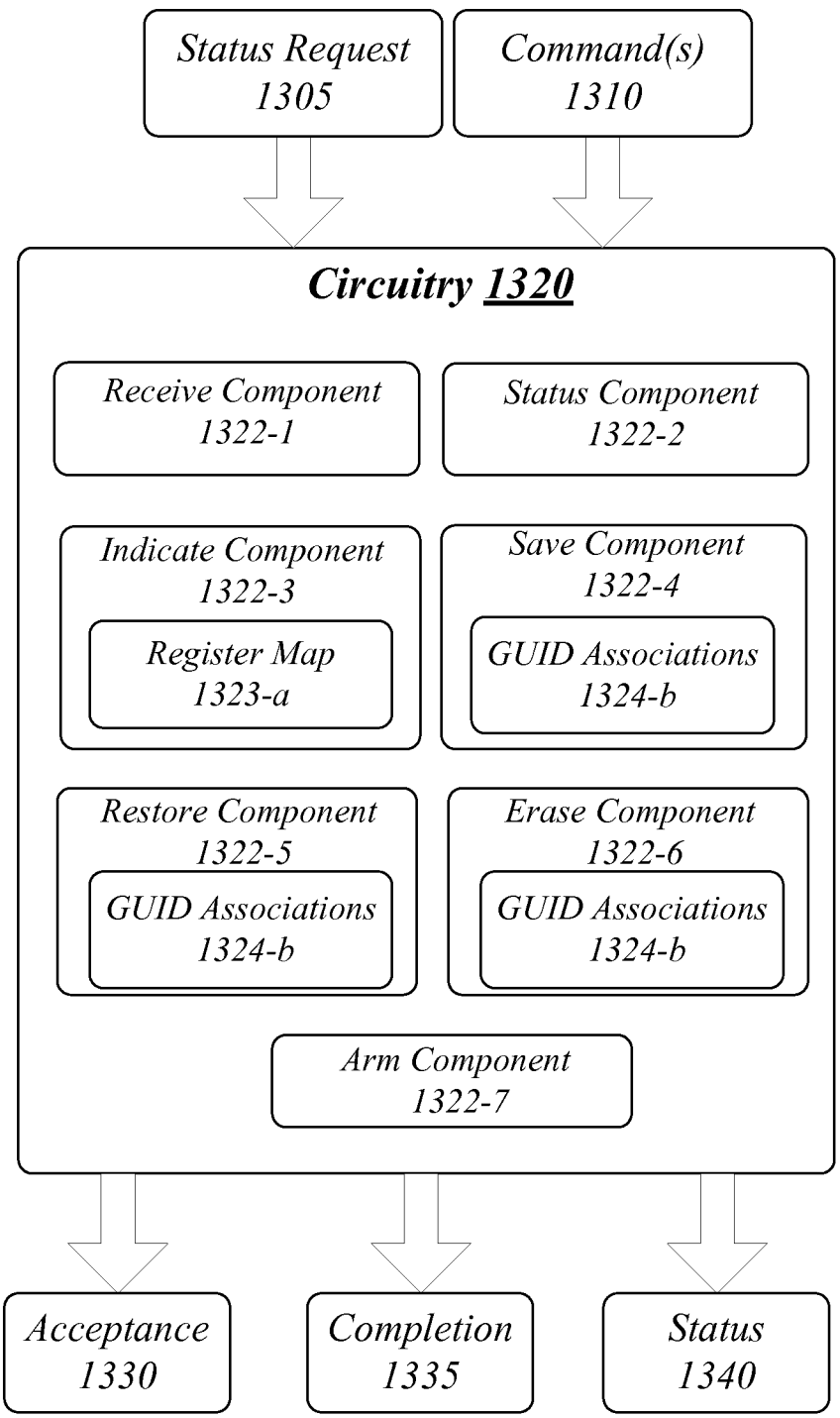
FIG. 13 illustrates an example block diagram for a first apparatus.

FIG. 13 illustrates an example block diagram for a first apparatus 1300. As shown in FIG. 13, the first apparatus includes an apparatus 1300. Although apparatus 1300 shown in FIG. 13 has a limited number of elements in a certain topology, it may be appreciated that the apparatus 1300 may include more or less elements in alternate topologies as desired for a given implementation.

The apparatus 1300 may be supported by circuitry 1320 maintained at an NVDIMM controller that may be coupled to a host computing platform. Circuitry 1320 may be arranged to execute one or more software or firmware implemented components 1322-a. It is worthy to note that "a" and "b" and "c" and similar designators as used herein are intended to be variables representing any positive integer. Thus, for example, if an implementation sets a value for a=7, then a complete set of software or firmware for components 1322-a may include components 1322-1, 1322-2, 1322-3, 1322-4, 1322-5, 1322-6 or 1322-7. The examples presented are not limited in this context and the different variables used throughout may represent the same or different integer values.

According to some examples, circuitry 1320 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1320 may also be an application specific integrated circuit (ASIC) and at least some components 1322-a may be implemented as hardware elements of the ASIC.

According to some examples, apparatus 1300 may include a receive component 1322-1. Receive component 1322-1 may be executed by circuitry 1320 to receive a status request. For these examples, the status request may be included in status request 1305 and may be received from a requestor at the host computing platform. The requestor may be coupled in communication with the NVDIMM controller through an SMBus interface. The requestor, for example, may include a BIOS, device driver or application implemented by host circuitry for the host computing platform coupled with the NVDIMM.

In some examples, apparatus 1300 may also include a status component 1322-2. Status component 1322-2 may be executed by circuitry 1320 to determine a status responsive to the status request. The status may be a status of the NVDIMM controller or a health check status for one or more elements of the NVDIMM such as non-volatile or volatile memory modules.

In some examples, apparatus 1300 may also include an indicate component 1322-3. Indicate component 1322-3 may be executed by circuitry 1320 to indicate the status determined by status component 1322-2 via selective assertion of a first set of bits maintained in a first set of registers to indicate status 1340. For these examples, the selective assertion may be based on register map 1323-a (e.g., maintained in a data structure such as a lookup table (LUT)). The first set of registers may be accessible to the requestor of the status request through the SMBus interface. Also, in some examples, indicate component 1322-3 may be capable of indicating acceptance and completion status for the request or for possible commands (e.g., command(s) 1310) received from the requestor. For example, acceptance 1330 and completion 1335 may be indicated based on register map 1323-a for acceptance of a request or command and subsequent completion of the request or command via assertion of bits for fields of register map 1323-a associated with request or command. The registers for the asserted bits may be accessible to the requestor through the SMBus interface for the requestor to determine whether the request or command has been accepted and/or completed.

In some examples, apparatus 1300 may also include a save component 1322-4. Save component 1322-4 may be executed by circuitry 1320 to save data in a first region of non-volatile memory for the NVDIMM and maintain an association between a first GUID indicated by the requestor issuing a SAVE command and the first region. For these examples, the first GUID may be indicated with a command included in command(s) 1310. Save component 1322-4 may maintain or have access to GUID associations 1324-*b* for maintaining the association between the first GUID and the first region (e.g., via a LUT).

In some examples, apparatus 1300 may also include a restore component 1322-5. Restore component 1322-5 may be executed by circuitry 1320 to restore data from a first region of the non-volatile memory. For these examples, the first region may have been previously associated with a first GUID (e.g., by save component 1322-4). The first GUID may have been indicated by requestor issuing a RESTORE command. Restore component 1322-5 may have access to GUID associations 1324-*b* to determine that the first region has been associated with the first GUID and then carry out the RESTORE command.

In some examples, apparatus 1300 may also include an erase component 1322-6. Erase component 1322-6 may be executed by circuitry 1320 to erase data from a first region of the non-volatile memory. For these examples, the first region may have been previously associated with a first GUID (e.g. by save component 1322-4). The first GUID may have been indicated by requestor issuing an ERASE command. Erase component 1322-6 may have access to GUID associations 1324-*b* to determine that the first region has been associated with the first GUID and then carry out the ERASE command to erase the data in the first region of the non-volatile memory.

In some examples, apparatus 1300 may also include an Arm component 1322-7. Arm component 1322-7 may be executed by circuitry 1320 to cause one or more capacitors coupled with the NVDIMM to charge or ARM. For these examples, save component 1322-4 may be capable of implementing a catastrophic save operation using power supplied by the one or more capacitors to preserve data maintained in the volatile memory of the NVDIMM if a direct current power supply loss is sensed or expected by the NVDIMM controller or an element of the host computing platform (e.g., BIOS or a device driver).

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 14:
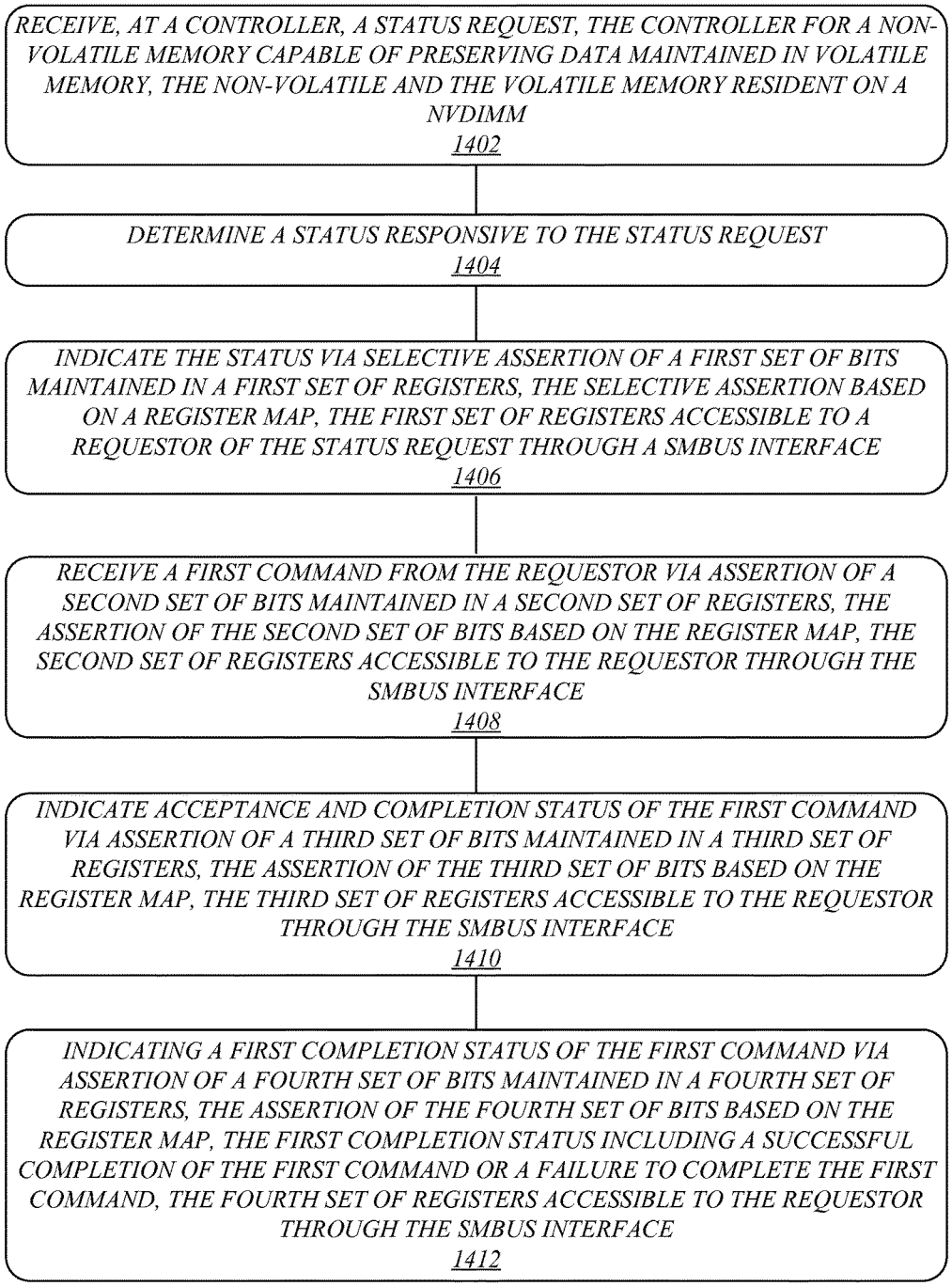
FIG. 14 illustrates an example of a first logic flow.

FIG. 14 illustrates an example of a first logic flow. As shown in FIG. 14 the first logic flow includes a logic flow 1400. Logic flow 1400 may be representative of some or all of the operations executed by one or more logic, features, or devices described herein, such as apparatus 1300. More particularly, logic flow 1400 may be implemented by receive component 1322-1, status component 1322-2, indicate component 1322-3, save component 1322-4, restore component 1322-5, erase component 1322-6 or Arm component 1322-7.

According to some examples, logic flow 1400 at block 1402 may receive, at a controller, a status request, the controller for a non-volatile memory capable of preserving data maintained in volatile memory, the non-volatile and the volatile memory resident on an NVDIMM. For these examples, receive component 1322-1 may receive the status request from a requestor that may include a BIOS, an application or device driver implemented by circuitry at a host computing platform coupled to the NVDIMM.

In some examples, logic flow 1400 at block 1404 may determine a status responsive to the status request. For these examples, status component 1322-2 may determine the status.

According to some examples, logic flow 1400 at block 1406 may indicate the status via selective assertion of a first set of bits maintained in a first set of registers. The selective assertion may be based on a register map. The first set of registers may be accessible to a requestor of the status request through an SMBus interface. For these examples, indicate component 1322-3 may indicate the status.

In some examples, logic flow 1400 at block 1408 may receive a first command from the requestor via assertion of a second set of bits maintained in a second set of registers. The assertion of the second set of bits may be based on the register map. The second set of registers may be accessible to the requestor through the SMBus interface. For these examples, receive component 1322-1 may receive the command.

According to some examples, logic flow 1400 at block 1410 may indicate acceptance and completion status of the first command via assertion of a third set of bits maintained in a third set of registers. The assertion of the third set of bits may be based on the register map. The third set of registers may be accessible to the requestor through the SMBus interface. For these examples, indicate component 1322-3 may indicate the acceptance and completion status.

In some examples, logic flow 1400 at block 1412 may indicate a first completion status of the first command via assertion of a fourth set of bits maintained in a fourth set of registers. The assertion of the fourth set of bits may be based on the register map. The first completion status may include a successful completion of the first command or a failure to complete the first command. The fourth set of registers may be accessible to the requestor through the SMBus interface. For these examples, indicate component 1322-3 may indicate the first completion status of the first command.

FIG. 15 illustrates an example of a first storage medium. As shown in FIG. 15, the first storage medium includes a storage medium 1500. The storage medium 1500 may comprise an article of manufacture. In some examples, storage medium 1500 may include any non-transitory computer readable medium or machine readable medium, such as an optical, magnetic or semiconductor storage. Storage medium 1500 may store various types of computer executable instructions, such as instructions to implement logic flow 1400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 16:
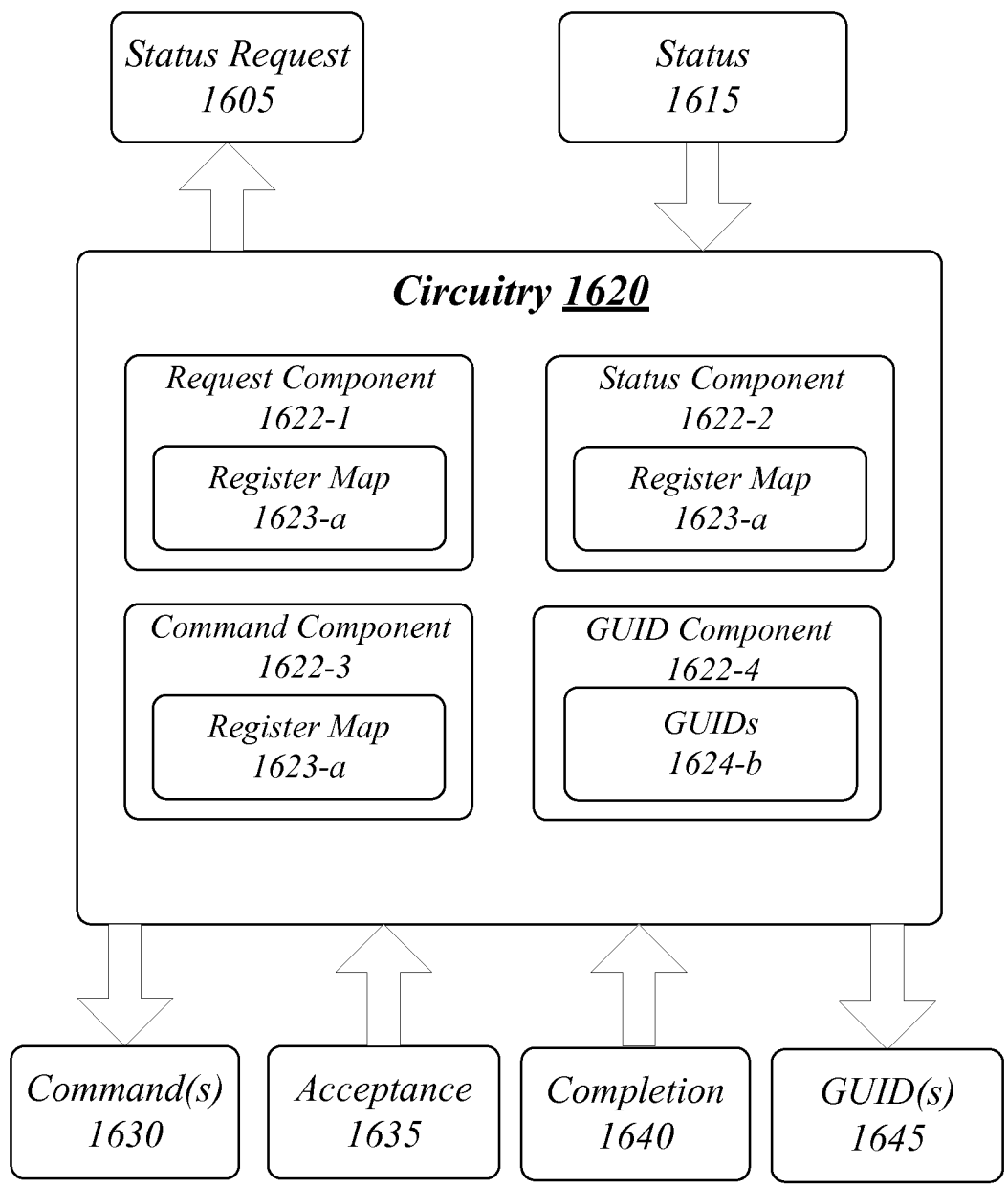
FIG. 16 illustrates an example block diagram for a second apparatus.

FIG. 16 illustrates an example block diagram for a second apparatus. As shown in FIG. 16, the second apparatus includes an apparatus 1600. Although apparatus 1600 shown in FIG. 16 has a limited number of elements in a certain topology or configuration, it may be appreciated that apparatus 1600 may include more or less elements in alternate configurations as desired for a given implementation.

The apparatus 1600 may be supported by circuitry 1620 maintained at a host computing platform. Circuitry 1620 may be arranged to execute one or more software or firmware implemented components 1622-a. It is worthy to note that "a" and "b" and "c" and similar designators as used herein are intended to be variables representing any positive integer. Thus, for example, if an implementation sets a value for a=4, then a complete set of software or firmware for components 1622-a may include components 1622-1, 1622-2, 1622-3 or 1622-4. The examples presented are not limited in this context and the different variables used throughout may represent the same or different integer values.

In some examples, as shown in FIG. 16, apparatus 1600 includes circuitry 1620. Circuitry 1620 may be generally arranged to execute one or more software and/or firmware components 1622-a. Circuitry 1620 may be part of a host computing platform's circuitry that includes processing cores (e.g., used as a central processing unit (CPU)). Alternatively circuitry 1620 may part of the circuitry in a chipset for the host computing platform. In either scenario, circuitry 1620 may be a part of any of various commercially available processors to include, but not limited to, those previously mentioned for circuitry 1320 for apparatus 1300. Circuitry 1620 may also be part of dual microprocessors, multi-core processors, and other multi-processor architectures. According to some examples, circuitry 1620 may also be an ASIC and components 1622-a may be implemented as hardware elements of the ASIC.

According to some examples, apparatus 1600 may include a request component 1622-1. Request component 1622-1 may be executed by circuitry 1620 to send a status request to an NVDIMM controller for an NVDIMM coupled with the host computing platform that includes apparatus 1600. For these examples request component 1622-1 may have access to registers at the NVDIMM controller via an SMBus interface and may send status request 1605 using one or more portions of a register map included in register map 1623-a, e.g., maintained in a data structure such as a lookup table (LUT) accessible to request component 1622-1.

In some examples, apparatus 1600 may also include a status component 1622-2. Status component 1622-2 may be executed by circuitry 1620 to access a bits maintained in registers at the NVDIMM controller through the SMBus interface. The bits may indicate a status indicated by the NVDIMM controller responsive to the status request via selective assertion of the bits based on the register map included in register map 1623-a, e.g., maintained in a LUT accessible to status component 1622-2. For these examples, the status may be included in status 1615 and status component 1622-2 may use one or more portions of the register map to determine the status indicated by the NVDIMM controller.

According to some examples, apparatus 1600 may also include a command component 1622-3. Command component 1622-3 may be executed by circuitry 1620 to send commands via assertion of bits maintained in the registers at the NVDIMM controller. The assertion of the bits may be according to one or more portions of the register map included in register map 1623-a, e.g., maintained in a LUT accessible to command component 1622-3. For these examples, the portion of the register map used may be based on the command included in command(s) 1630 such as a SAVE, RESTORE, Self-Refresh Save or an ERASE command. Command component 1622-3 may receive an indication that the command was accepted via acceptance 1635 and if accepted, an indication of completion of the command via completion 1640. The indications may be indicated by the NVDIMM controller selectively asserting bits based on one or more portions of the register map and based on the command sent by command component 1622-3.

In some examples, apparatus 1600 may also include a GUID component 1622-4. GUID component 1622-4 may be executed by circuitry 1620 to indicate a GUID in GUID(s) 1645 for an image or content maintained in the volatile memory to save the image in a region of the non-volatile memory and to preserve or maintain an association between the indicated GUID and the region of the non-volatile memory. For these examples, GUID component 1622-4 may also preserve the association for possible future use for ERASE or RESTORE commands in GUIDs 1624-4 (e.g., maintained in a LUT). These GUIDs may be provided to command component 1622-3 for inclusion in these types of ERASE or RESTORE commands when sent.

Various components of apparatus 1600 and a host computing platform including apparatus 1600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 17:
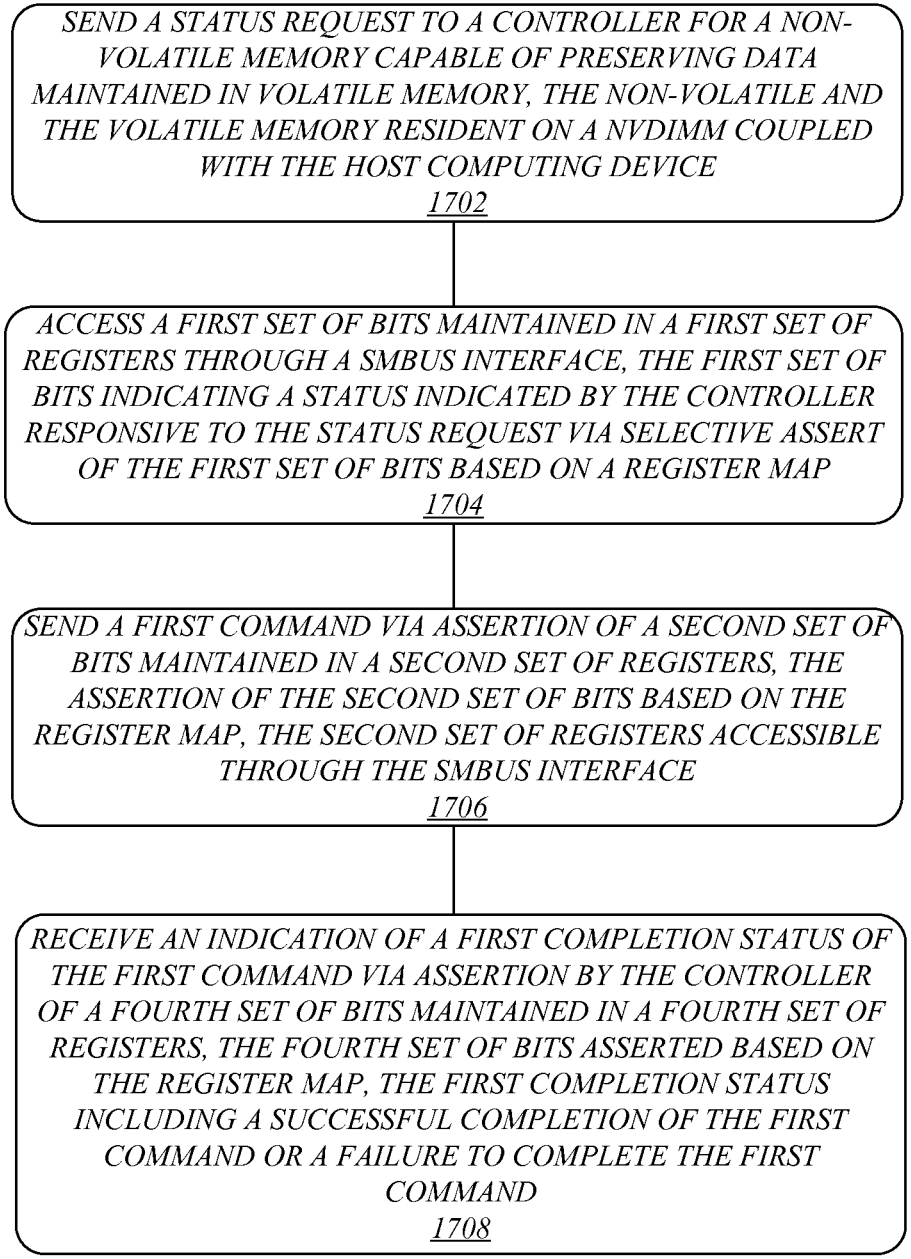
FIG. 17 illustrates an example of a second logic flow.

FIG. 17 illustrates an example of a second logic flow. As shown in FIG. 17, the second logic flow includes a logic flow 1700. Logic flow 1700 may be representative of some or all of the operations executed by one or more logic, features, or devices described herein, such as apparatus 1600. More particularly, logic flow 1700 may be implemented by request component 1622-1, status component 1622-2, command component 1622-3 or GUID component 1622-4.

In the illustrated example shown in FIG. 17, logic flow 1700 at block 1702 may send a status request to a controller for a non-volatile memory capable of preserving data maintained in volatile memory. The non-volatile and the volatile memory may be resident on an NVDIMM coupled with a host computing platform. For these examples, request component 1622-1 may cause the status request to be sent.

According to some examples, logic flow 1700 at block 1704 may access a first set of bits maintained in a first set of registers through an SMBus interface. The first set of bits may indicate a status indicated by the controller responsive to the status request via selective assertion of the first set of bits based on a register map. For these examples, status component 1622-2 may access the first set of bits through the SMBus interface and may determine the status indicated by the controller based on the register map.

According to some examples, logic flow 1700 at block 1706 may send a first command via assertion of a second set of bits maintained in a second set of registers. The assertion of the second set of bits may be based on the register map. The second set of registers may also be accessible through the SMBus interface. For these examples, command component 1622-2 may cause the command to be sent by asserting the second set of bits based on the register map.

In some examples, logic flow 1700 at block 1708 receive an indication of acceptance and completion status of the first command via assertion by the controller of a third set of bits maintained in a third set of registers. The third set of bits may be asserted based on the register map. The third set of registers may also be accessible through the SMBus interface. For these examples, command component 1622-3 may be capable of accessing the third set of registers to determine which bits have been asserted and to determine whether acceptance and completion of the command was indicated based on the register map.

FIG. 18 illustrates an example of a second storage medium. As shown in FIG. 18, the second storage medium includes a storage medium 1800. Storage medium 1800 may comprise an article of manufacture. In some examples, storage medium 1800 may include any non-transitory computer readable medium or machine readable medium, such as an optical, magnetic or semiconductor storage. Storage medium 1800 may store various types of computer executable instructions, such as instructions to implement logic flow 1500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 19:
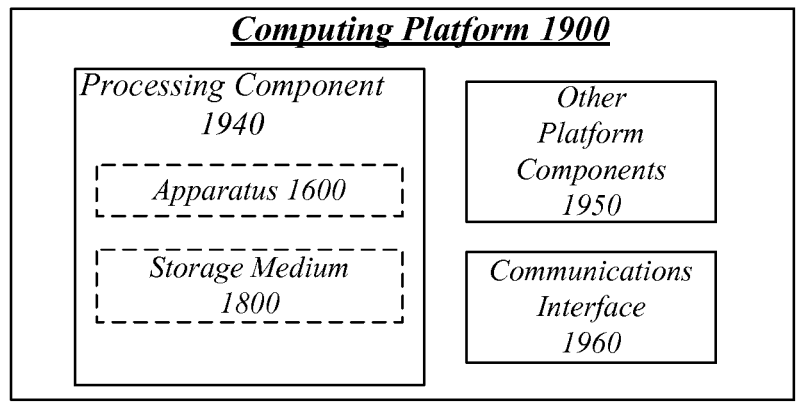
FIG. 19 illustrates an example computing platform.

FIG. 19 illustrates an example computing platform 1900. In some examples, as shown in FIG. 19, computing platform 1900 may include a processing component 1940, other platform components or a communications interface 1960. According to some examples, computing platform 1900 may be part of a host computing platform as mentioned above.

According to some examples, processing component 1940 may execute processing operations or logic for apparatus 1600 and/or storage medium 1800. Processing component 1940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1960 may include logic and/or features to support a communication interface. For these examples, communications interface 1960 may include one or more communication interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 1900 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1900 described herein, may be included or omitted in various embodiments of computing platform 1900, as suitably desired.

The components and features of computing platform 1900 may be implemented using any combination of discrete circuitry, application specific integrated circuits (ASICs), logic gates and/or single chip architectures. Further, the features of computing platform 1900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 1900 shown in the block diagram of FIG. 19 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 20:
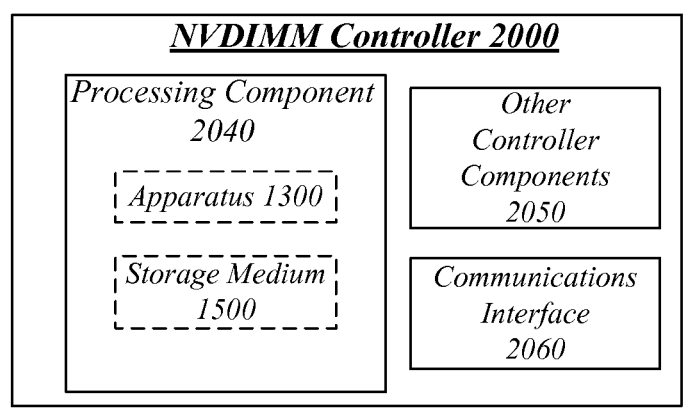
FIG. 20 illustrates an example non-volatile dual in-line memory module controller.

FIG. 20 illustrates an example NVDIMM controller 2000. In some examples, as shown in FIG. 20, NVDIMM controller 2000 may include a processing component 2040, other platform components 2050 or a communications interface 2060. According to some examples, NVDIMM controller 2000 may be implemented in an NVDIMM controller resident on or with an NVDIMM coupled to a host computing platform as mentioned above.

According to some examples, processing component 2040 may execute processing operations or logic for apparatus 1300 and/or storage medium 1500. Processing component 2040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other controller components 2050 may include common computing elements, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 2060 may include logic and/or features to support a communication interface. For these examples, communications interface 2060 may include one or more communication interfaces that operate according to various communication protocols or standards to communicate over communication links or channels. Communications may occur via use of communication protocols or standards described in one or more industry standards (including progenies and variants) such as those associated with the PCI Express specification or the SMBus specification.

The components and features of NVDIMM controller 2000 may be implemented using any combination of discrete circuitry, application specific integrated circuits (ASICs), logic gates and/or single chip architectures. Further, the features of NVDIMM controller 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example NVDIMM controller 2000 shown in the block diagram of FIG. 20 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry at a controller for a non-volatile memory capable of preserving data maintained in volatile memory. The non-volatile and the volatile memory may be resident on an NVDIMM. The example apparatus may also include a receive component for execution by the circuitry to receive a status request. The example apparatus may also include a status component for execution by the circuitry to determine a status responsive to the status request. The example apparatus may also include an indicate component for execution by the circuitry to indicate the status via selective assertion of a first set of bits maintained in a first set of registers of the NVDIMM. For this example, the selective assertion may be based on a register map.

Example 2

The example apparatus of example 1, the first set of registers may be accessible to a requestor of the status request through an SMBus interface.

Example 3

The example apparatus of example 2, the requester may include a basic input/output system (BIOS), an application or a device driver implemented by host circuitry at a host computing platform coupled with the NVDIMM.

Example 4

The example apparatus of example 1, the status request may include a request for a health status of the NVDIMM.

Example 5

The example apparatus of example 1, the status request may include a request for a state of the controller or of the NVDIMM.

Example 6

The example apparatus of example 5, the indicate component may indicate the status as at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

Example 7

The example apparatus of example 2 also including the receive component to receive a first command from the requestor via assertion of a second set of bits maintained in a second set of registers of the NVDIMM. For this examples, the assertion of the second set of bits may be based on the register map, the second set of registers accessible to the requestor through the SMBus interface. The example apparatus of example 2 also including the indicate component to indicate acceptance and completion status of the first command via assertion of a third set of bits maintained in a third set of registers of the NVDIMM, the assertion of the third set of bits based on the register map. For this example, the third set of registers may be accessible to the requestor through the SMBus interface.

Example 8

The example apparatus of example 7, the indicate component may indicate a first completion status of the first command via assertion of a fourth set of bits maintained in a fourth set of registers of the NVDIMM. For this example, the assertion of the fourth set of bits may be based on the register map. The first completion status may include a successful completion of the first command or a failure to complete the first command. The fourth set of registers may be accessible to the requestor through the SMBus interface.

Example 9

The example apparatus of example 8 also including the receive component to receive an abort command from the requestor to abort the first command via assertion of a fifth set of bits maintained in a fifth set of registers of the NVDIMM. For this example, the assertion of the fifth set of bits may be based on the register map. The fifth set of registers accessible to the requestor through the SMBus interface. The example apparatus of example 8 also including the indicate component to indicate acceptance of the abort command and subsequent completion of the abort command via assertion of a sixth set of bits maintained in a sixth set of registers of the NVDIMM. The assertion of the sixth set of bits may be based on the register map. The sixth set of registers may be accessible to the requestor through the SMBus interface.

Example 10

The example apparatus of example 8, the first command may include a save command to preserve data maintained in the volatile memory at a given point in time.

Example 11

The example apparatus of example 8 also including a save component for execution by the circuitry to save the data in a first region of the non-volatile memory and maintain an association between a first GUID indicated by the requestor. For this example, the GUID may be indicated with the save command.

Example 12

The example apparatus of example 8, the first command may include a restore command to restore data saved in the non-volatile memory to the volatile memory.

Example 13

The example apparatus of example 12 also including a restore component for execution by the circuitry to restore the data from a first region of the non-volatile memory. For this example, the first region may have been previously associated with a first GUID indicated by the requestor, the GUID indicated with the restore command.

Example 14

The example apparatus of example 8, the first command may include an erase command to erase data saved in the non-volatile memory.

Example 15

The example apparatus of example 14 also including an erase component for execution by the circuitry to erase the data from a first region of the non-volatile memory. For this example, the first region may have been previously associated with a first GUID indicated by the requestor. The GUID may be indicated with the erase command.

Example 16

The example apparatus of example 8 also include the first command received by the receive component is an arm command. The example apparatus of example 8 also including an arm component for execution by the circuitry to cause one or more capacitors coupled with the NVDIMM to charge. The example apparatus of example 8 also including a save component for execution by the circuitry capable of implementing a catastrophic save using power supplied by the one or more capacitors to preserve data maintained in the volatile memory if a direct current power supply loss is sensed or expected.

Example 17

The example apparatus of example 16 also including the receive component to receive a disarm command from the requestor. For this example, the disarm command may be received via assertion of a fifth set of bits maintained in a fifth set of registers of the NVDIMM. The assertion of the fifth set of bits may be based on the register map. The fifth set of registers may be accessible to the requestor through the SMBus interface. For this example, the arm component may allow the one or more capacitors to discharge responsive to the disarm command. Also, for this example, the indicate component may indicate acceptance of the disarm command and subsequent completion of the disarm command via assertion of a sixth set of bits maintained in a sixth set of register of the NVDIMM. The assertion of the sixth set of bits may be based on the register map. The sixth set of registers may be accessible to the requestor through the SMBus interface.

Example 18

The example apparatus of example 1, the non-volatile memory may include NAND flash memory and the volatile memory may include DRAM.

Example 19

An example method may include receiving, at a controller, a status request, the controller for a non-volatile memory capable of preserving data maintained in volatile memory. The non-volatile and the volatile memory may be resident on an NVDIMM. The example method may also include determining a status responsive to the status request and indicating the status via selective assertion of a first set of bits maintained in a first set of registers of the NVDIMM. The selective assertion may be based on a register map.

Example 20

The example method of example 19, the first set of registers may be accessible to a requestor of the status request through an SMBus interface.

Example 21

The example method of example 20, the requester may include BIOS, an application or a device driver implemented by circuitry at a host computing platform coupled with the NVDIMM.

Example 22

The example method of example 19, the status request may include a request for a health status of the NVDIMM.

Example 23

The example method of example 19, the status request may include a request for a state of the controller or of the NVDIMM.

Example 24

The example method of example 23, indicating the status may include indicating at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

Example 25

The example method of example 20 also including receiving a first command from the requestor via assertion of a second set of bits maintained in a second set of registers of the NVDIMM. For this example, the assertion of the second set of bits may be based on the register map. The second set of registers may be accessible to the requestor through the SMBus interface. The example method of example 20 also including indicating acceptance and completion status of the first command via assertion of a third set of bits maintained in a third set of registers of the NVDIMM. The assertion of the third set of bits may be based on the register map. The third set of registers may be accessible to the requestor through the SMBus interface.

Example 26

The example method of example 25 also including indicating a first completion status of the first command via assertion of a fourth set of bits maintained in a fourth set of registers of the NVDIMM. For this example, the assertion of the fourth set of bits may be based on the register map. The first completion status may include a successful completion of the first command or a failure to complete the first command, the fourth set of registers accessible to the requestor through the SMBus interface.

Example 27

The example method of example 25 also including receiving an abort command from the requestor to abort the first command via assertion of a fifth set of bits maintained in a fifth set of registers of the NVDIM. For this example, the assertion of the fifth set of bits may be based on the register map. The fifth set of registers may be accessible to the requestor through the SMBus interface. Also, the example method of example 25 may include indicating acceptance of the abort command and subsequent completion of the abort command via assertion of a sixth set of bits maintained in a sixth set of register of the NVDIMM, the assertion of the sixth set of bits based on the register map. The sixth set of registers may be accessible to the requestor through the SMBus interface.

Example 28

The example method of example 26, the first command may include a save command to preserve data maintained in the volatile memory at a given point in time.

Example 29

The example method of example 28, the requestor to indicate a first GUID for the controller to save the data in a first region of the non-volatile memory and preserve an association between the first GUID and the first region.

Example 30

The example method of example 26, the first command may include a restore command to restore data saved in the non-volatile memory to the volatile memory.

Example 31

The example method of example 30, the requestor may indicate a first GUID for the controller to restore the data from a first region of the non-volatile memory. The first region may have been previously associated with the first GUID by the controller.

Example 32

The example method of example 26, the first command may include an erase command to erase data saved in the non-volatile memory.

Example 33

The example method of example 32, the request may indicate a first GUID for the controller to erase the data from a first region of the non-volatile memory. The first region may have been previously associated with the first GUID by the controller.

Example 34

The example method of example 26, the first command may include an arm command indicating to the controller to cause one or more capacitors coupled with the NVDIMM to charge and enable the controller to implement a catastrophic save using power supplied by the one or more capacitors to preserve data maintained in the volatile memory if a direct current power supply loss is sensed or expected.

Example 35

The example method of example 34 also including receiving a disarm command from the requestor indicating to the controller to allow the one or more capacitors to discharge. The disarm command may be received via assertion of a fifth set of bits maintained in a fifth set of register of the NVDIMM. The assertion of the fifth set of bits may be based on the register map. The fifth set of registers may be accessible to the requestor through the SMBus interface. The example method of example 34 also including indicating acceptance of the disarm command and subsequent completion of the disarm command via assertion of a sixth set of bits maintained in a sixth set of register of the NVDIMM.

33

The assertion of the sixth set of bits may be based on the register map. The sixth set of registers may be accessible to the requestor through the SMBus interface.

Example 36

The example method of example 19, the non-volatile memory including NAND flash memory and the volatile memory including DRAM.

Example 37

An example machine readable medium including a plurality of instructions that in response to being executed by a controller for a non-volatile memory capable of preserving data maintained in volatile memory. The non-volatile and the volatile memory may be resident on an NVDIMM and the instructions may cause the controller to carry out a method according to any one of examples 19 to 35.

Example 38

An example apparatus may include means for performing the methods of any one of example 19 to 35.

Example 39

An example machine readable medium including a plurality of instructions that in response to being executed by a controller for a non-volatile memory capable of preserving data maintained in volatile memory. The non-volatile and the volatile memory may be resident on an NVDIMM. The instructions may cause the controller to receive a status request. The instructions may also cause the controller to determine a status responsive to the status request. The instructions may also cause the controller to indicate the status via selective assertion of a first set of bits maintained in a first set of register of the NVDIM. The selective assertion may be based on a register map.

Example 40

The example at least one machine readable medium of example 39, the first set of registers accessible to a requestor of the status request through an SMBus interface.

Example 41

The example at least one machine readable medium of example 40, the requester may include a basic input/output system (BIOS), an application or a device driver implemented by circuitry at a host computing platform coupled with the NVDIMM.

Example 42

The example at least one machine readable medium of example 40, the status request may include a request for a health status of the NVDIMM.

Example 43

The example at least one machine readable medium of example 40 the status request may include a request for a state of the controller or of the NVDIMM.

Example 44

The example at least one machine readable medium of example 43, the instructions may cause the controller to

34 indicate the status by indicating at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

Example 45

The example at least one machine readable medium of example 40 also including instructions to cause the controller to receive a first command from the requestor via assertion of a second set of bits maintained in a second set of register of the NVDIMM. The assertion of the second set of bits may be based on the register map, the second set of registers accessible to the requestor through the SMBus interface. The example at least one machine readable medium of example 40 also including instructions to cause the controller to indicate acceptance and completion status of the first command via assertion of a third set of bits maintained in a third set of registers of the NVDIM. The assertion of the third set of bits based on the register map. The third set of registers may be accessible to the requestor through the SMBus interface.

Example 46

The example at least one machine readable medium of example 45 also including instructions to cause the controller to indicate a first completion status of the first command via assertion of a fourth set of bits maintained in a fourth set of register of the NVDIMM. The assertion of the fourth set of bits may be based on the register map. The first completion status may include a successful completion of the first command or a failure to complete the first command, the fourth set of registers accessible to the requestor through the SMBus interface.

Example 47

The example at least one machine readable medium of example 44 also including instructions to cause the controller to receive an abort command from the requestor to abort the first command via assertion of a fifth set of bits maintained in a fifth set of register of the NVDIMM. The assertion of the fifth set of bits may be based on the register map. The fifth set of registers may be accessible to the requestor through the SMBus interface. The example at least one machine readable medium of example 44 also including instructions to cause the controller to indicate acceptance of the abort command and subsequent completion of the abort command via assertion of a sixth set of bits maintained in a sixth set of register of the NVDIMM. The assertion of the sixth set of bits may be based on the register map. The sixth set of registers may be accessible to the requestor through the SMBus interface.

Example 48

The example at least one machine readable medium of example 46, the first command may include a save command to preserve data maintained in the volatile memory at a given point in time.

Example 49

The example at least one machine readable medium of example 46, the requestor may indicate a first GUID for the controller to save the data in a first region of the non-volatile memory and preserve an association between the first GUID and the first region.

Example 50

The example at least one machine readable medium of example 46, the first command may include a restore command to restore data saved in the non-volatile memory to the volatile memory.

Example 51

The example at least one machine readable medium of example 50, the requestor may indicate a first GUID for the controller to restore the data from a first region of the non-volatile memory. The first region may have been previously associated with the first GUID by the controller.

Example 52

The example at least one machine readable medium of example 46, the first command may include an erase command to erase data saved in the non-volatile memory.

Example 53

The example at least one machine readable medium of example 52, the request may indicate a first GUID for the controller to erase the data from a first region of the non-volatile memory. The first region may have been previously associated with the first GUID by the controller.

Example 54

The example at least one machine readable medium of example 46, the first command may include an arm command indicating to the controller to cause one or more capacitors coupled with the NVDIMM to charge and enable the controller to implement a catastrophic save using power supplied by the one or more capacitors to preserve data maintained in the volatile memory if a direct current power supply loss is sensed or expected.

Example 55

The example at least one machine readable medium of example 54 also including instructions to cause the controller to receive a disarm command from the requestor indicating to the controller to allow the one or more capacitors to discharge. The disarm command may be received via assertion of a fifth set of bits maintained in a fifth set of register of the NVDIMM. The assertion of the fifth set of bits may be based on the register map. The fifth set of registers may be accessible to the requestor through the SMBus interface. The example at least one machine readable medium of example 54 also including instructions to cause the controller to indicate acceptance of the disarm command and subsequent completion of the disarm command via assertion of a sixth set of bits maintained in a sixth set of register of the NVDIMM. The assertion of the sixth set of bits may be based on the register map. The sixth set of registers may be accessible to the requestor through the SMBus interface.

Example 56

The example at least one machine readable medium of example 46, the non-volatile memory may include NAND flash memory and the volatile memory including DRAM.

Example 57

An example method may include sending, at a device driver implemented by circuitry at a host computing platform, a status request to a controller for a non-volatile memory capable of preserving data maintained in volatile memory. For this example, the non-volatile and the volatile memory may be resident on an NVDIMM coupled with the host computing platform. The example method may also include, accessing a first set of bits maintained in a first set of register of the NVDIMM through an SMBus interface. The first set of bits may indicate a status indicated by the controller responsive to the status request via selective asserting of the first set of bits based on a register map.

Example 58

The method of example 57, the status request may include a request for a health status of the NVDIMM.

Example 59

The method of example 57, the status request may include a request for a state of the controller or of the NVDIMM.

Example 60

The method of example 59, the indicated status may include at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

Example 61

The method of example 57 also including sending a first command via assertion of a second set of bits maintained in a second set of register of the NVDIMM. The assertion of the second set of bits may be based on the register map. The second set of registers may be accessible to the device driver through the SMBus interface. The method of example 57 also including receiving an indication of acceptance and completion status of the first command via assertion by the controller of a third set of bits maintained in a third set of registers of the NVDIMM. The third set of bits may be asserted based on the register map. The third set of registers may be accessible to the device driver through the SMBus interface.

Example 62

The method of example 61 also including receiving an indication of a first completion status of the first command via assertion by the controller of a fourth set of bits maintained in a fourth set of register of the NVDIMM. The fourth set of bits may be asserted based on the register map. The completion status may include a successful completion of the first command or a failure to complete the first command. The fourth set of registers may be accessible to the device driver through the SMBus interface.

Example 63

The method of example 62 also including sending an abort command to abort the first command via assertion of a fifth set of bits maintained in a fifth set of register of the NVDIMM. The assertion of the fifth set of bits may be based on the register map. The fifth set of registers may be accessible to the device driver through the SMBus interface. The method of example 62 also including receiving an indication of acceptance of the abort command and subsequent completion of the abort command via assertion by the controller of a sixth set of bits maintained in a sixth set of register of the NVDIMM. The assertion of the sixth set of bits may be based on the register map. The sixth set of registers may be accessible to the device driver through the SMBus interface.

Example 64

The method of example 62, the first command may include a save command to preserve data maintained in the volatile memory at a given point in time.

Example 65

The method of example 64 also including indicating a first GUID for the controller to save the data in a first region of the non-volatile memory and preserve an association between the first GUID and the first region.

Example 66

The method of example 62, the first command may include a restore command to restore data saved in the non-volatile memory to the volatile memory.

Example 67

The method of example 66 also including indicating a first GUID for the controller to restore the data from a first region of the non-volatile memory, the first region previously associated with the first GUID by the controller.

Example 68

The method of example 62, the first command may include an erase command to erase data saved in the non-volatile memory.

Example 69

The method of example 68 also including indicating a first GUID for the controller to erase the data from a first region of the non-volatile memory. The first region may have been previously associated with the first GUID by the controller.

Example 70

The method of example 62, the first command may include an arm command indicating to the controller to cause one or more capacitors coupled with the NVDIMM to charge and enable the controller to implement a catastrophic save using power supplied by the one or more capacitors to preserve data maintained in the volatile memory if a direct current power supply loss is sensed or expected.

Example 71

The method of example 70 also including sending a disarm command indicating to the controller to allow the one or more capacitors to discharge. For this example, the disarm command may be sent via assertion of a fifth set of bits maintained in a fifth set of register of the NVDIMM. The assertion of the fifth set of bits may be based on the register map. The fifth set of registers may be accessible to the device driver through the SMBus interface. The method of example 70 also including receiving an indication of acceptance of the disarm command and subsequent completion of the disarm command via assertion by the controller of a sixth set of bits maintained in a sixth set of register of the NVDIMM. The assertion of the sixth set of bits may be based on the register map. The sixth set of registers may be accessible to the device driver through the SMBus interface.

Example 72

The method of example 57, the non-volatile memory may include NAND flash memory and the volatile memory may include DRAM.

Example 73

At least one machine readable medium including a plurality of instructions that in response to being executed by system at a host computing platform may cause the system to carry out a method according to any one of examples 57 to 72.

Example 74

An apparatus may include means for performing the methods of any one of examples 57 to 72.

Example 75

At least one machine readable medium may include a plurality of instructions that in response to being executed by system at a host computing platform may cause the system to send a status request to a controller for a non-volatile memory capable of preserving data maintained in volatile memory. The non-volatile and the volatile memory may be resident on an NVDIMM coupled with the host computing platform. The instructions may also cause the system to access a first set of bits maintained in a first set of register of the NVDIMM through an SMBus interface. The first set of bits may indicate a status indicated by the controller responsive to the status request via selective asserting of the first set of bits based on a register map.

Example 76

The at least one machine readable medium of example 75, the status request may include a request for a health status of the NVDIMM.

Example 77

The at least one machine readable medium of example 75, the status request may include a request for a state of the controller or of the NVDIMM.

Example 78

The at least one machine readable medium of example 77, the indicated status may include at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

Example 79

The at least one machine readable medium of example 75, the instructions to also cause the system to send a first command via assertion of a second set of bits maintained in a second set of register of the NVDIMM. The assertion of the second set of bits may be based on the register map. The second set of registers may be accessible through the SMBus interface. The instructions to also cause the system to receive an indication of acceptance and completion status of the first command via assertion by the controller of a third set of bits maintained in a third set of registers of the NVDIMM. The third set of bits may be asserted based on the register map. The third set of registers may be accessible through the SMBus interface.

Example 80

The at least one machine readable medium of example 79, the instructions to also cause the system to receive an indication of a first completion status of the first command via assertion by the controller of a fourth set of bits maintained in a fourth set of register of the NVDIMM. The fourth set of bits may be asserted based on the register map. The first completion status may include a successful completion of the first command or a failure to complete the first command.

Example 81

The at least one machine readable medium of example 80, the instructions to also cause the system to send an abort command to abort the first command via assertion of a fifth set of bits maintained in a fifth set of register of the NVDIMM. The assertion of the fifth set of bits may be based on the register map. The fifth set of registers may be accessible to through the SMBus interface. The instructions to also cause the system to receive an indication of acceptance of the abort command and subsequent completion of the abort command via assertion by the controller of a sixth set of bits maintained in a sixth set of register of the NVDIMM. The assertion of the sixth set of bits may be based on the register map. The sixth set of registers may be accessible through the SMBus interface.

Example 82

The at least one machine readable medium of example 80, the first command may include a save command to preserve data maintained in the volatile memory at a given point in time.

Example 83

The at least one machine readable medium of example 82, the instructions to also cause the system to indicate a first GUID for the controller to save the data in a first region of the non-volatile memory and preserve an association between the first GUID and the first region.

Example 84

The at least one machine readable medium of example 80, the first command may include a restore command to restore data saved in the non-volatile memory to the volatile memory.

Example 85

The at least one machine readable medium of example 84, the instructions to also cause the system to indicate a first GUID for the controller to restore the data from a first region of the non-volatile memory, the first region previously associated with the first GUID by the controller.

Example 86

The at least one machine readable medium of example 80, the first command may include an erase command to erase data saved in the non-volatile memory.

Example 87

The at least one machine readable medium of example 86, the instructions to also cause the system to indicate a first GUID for the controller to erase the data from a first region of the non-volatile memory. The first region may have been previously associated with the first GUID by the controller.

Example 88

The at least one machine readable medium of example 80, the first command may include an arm command that indicates to the controller to cause one or more capacitors coupled with the NVDIMM to charge and enable the controller to implement a catastrophic save using power supplied by the one or more capacitors to preserve data maintained in the volatile memory if a direct current power supply loss is sensed or expected.

Example 89

The at least one machine readable medium of example 88, the instructions to also cause the system to send a disarm command that indicates to the controller to allow the one or more capacitors to discharge. For this example, the disarm command may be sent via assertion of a fifth set of bits maintained in a fifth set of register of the NVDIMM. The assertion of the fifth set of bits may be based on the register map. The fifth set of registers may be accessible to the device driver through the SMBus interface. The instructions may also cause the system to receive an indication of acceptance of the disarm command and subsequent completion of the disarm command via assertion by the controller of a sixth set of bits maintained in a sixth set of register of the NVDIMM. The assertion of the sixth set of bits may be based on the register map, the sixth set of registers accessible through the SMBus interface.

Example 90

The at least one machine readable medium of example 75, the non-volatile memory may include NAND flash memory and the volatile memory may include DRAM.

Example 91

The at least one machine readable medium of example 75, the system may include a basic input/output system (BIOS), an application or a device driver.

Example 92

A system may include circuitry for a host computing platform to implement a BIOS, an application or a device driver. The system may also include an NVDIMM having resident non-volatile memory and volatile memory. The non-volatile memory may be capable of preserving data maintained in a volatile memory. The system may also include a controller for the non-volatile memory. The controller may be operative to receive a status request from the BIOS, the application or the device driver. The status request may include one of a request for a health status of the NVDIMM, a state of the controller or a state of the NVDIMM. The controller may also be operative to determine a status responsive to the status request and indicate the status via selective assertion of a first set of bits maintained in a first set of registers of the NVDIMM. The selective assertion may be based on a register map.

Example 93

The system of example 92 may include the first set of registers being accessible to the BIOS, the application or the device driver through a system management bus (SMBus) interface.

Example 94

The system of example 93, the controller also operative to receive a command from the BIOS, the application or the device driver via assertion of a second set of bits maintained in a second set of registers of the NVDIMM. For this example, the assertion of the second set of bits may be based on the register map. The second set of registers may be accessible to the BIOS, the application or the device driver through the SMBus interface. The controller may also be operative to indicate acceptance and completion status of the command via assertion of a third set of bits maintained in a third set of registers of the NVDIMM. The assertion of the third set of bits may be based on the register map. The third set of registers may be accessible to the BIOS, the application or the device driver through the SMBus interface. The controller may also be operative to indicate a completion status of the command via assertion of a fourth set of bits maintained in a fourth set of registers of the NVDIMM. The assertion of the fourth set of bits may be based on the register map. The completion status may include a successful completion of the command or a failure to complete the command. The fourth set of registers may be accessible to the BIOS, the application or the device driver through the SMBus interface.

Example 95

The system of example 94, the controller also operative to receive an abort command from the BIOS, the application or the device driver to abort the command via assertion of a fifth set of bits maintained in a fifth set of registers of the NVDIMM. For this example, the assertion of the fifth set of bits may be based on the register map. The fifth set of registers may be accessible to the BIOS, the application or the device driver through the SMBus interface. The controller may also be operative to indicate acceptance of the abort command and subsequent completion of the abort command via assertion of a sixth set of bits maintained in a sixth set of registers of the NVDIMM. The assertion of the sixth set of bits may be based on the register map. The sixth set of registers may be accessible to the BIOS, the application or the device driver through the SMBus interface.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry at a controller for a non-volatile memory capable of preserving data maintained in volatile memory, the non-volatile and the volatile memory resident on a non-volatile dual in-line memory module (NVDIMM), the NVDIMM comprising a first set of registers, a second set of registers, and a third set of registers;
   a receive component for execution by the circuitry to receive a status request and a first command, the first command to be received via assertion of a first set of bits maintained in the first set of registers, the assertion of the first set of bits based on a register map;
   a status component for execution by the circuitry to determine a status responsive to the status request; and
   an indicate component for execution by the circuitry to indicate the status via selective assertion of a second set of bits maintained in the second set of registers and to indicate acceptance and completion status of the first command via assertion of a third set of bits maintained in a third set of registers of the NVDIMM, the selective assertion based on the register map and the assertion of the third set of bits based on the register map.

2. The apparatus of claim 1, the first set of registers accessible to a requestor of the status request through a system management bus (SMBus) interface.

3. The apparatus of claim 2, the requester comprising a basic input/output system (BIOS), an application or a device driver implemented by host circuitry at a host computing platform coupled with the NVDIMM, the status request including at least one of a request for a health status of the NVDIMM, a request for a state of the controller or a request for a state of the NVDIMM.

4. The apparatus of claim 3, comprising the indicate component to indicate the status as at least one of a busy controller, a not busy controller, a save in progress, an abort save in progress, a restore in progress, an abort restore in progress, an erase in progress, an abort erase in progress, save pin not asserted on a previous start-up or boot of the NVDIMM, save pin asserted on a previous start-up or boot of the NVDIMM that triggered a catastrophic save, catastrophic save successful or catastrophic save not successful.

5. The apparatus of claim 2, the second set of registers accessible to the requestor through the SMBus interface and the third set of registers accessible to the requestor through the SMBus interface.

6. The apparatus of claim 5, comprising the indicate component to indicate a first completion status of the first command via assertion of a fourth set of bits maintained in a fourth set of registers of the NVDIMM, the assertion of the fourth set of bits based on the register map, the first completion status including a successful completion of the first command or a failure to complete the first command, the fourth set of registers accessible to the requestor through the SMBus interface.

7. The apparatus of claim 6, comprising:
the receive component to receive an abort command from the requestor to abort the first command via assertion of a fifth set of bits maintained in a fifth set of registers of the NVDIMM, the assertion of the fifth set of bits based on the register map, the fifth set of registers accessible to the requestor through the SMBus interface; and
the indicate component to indicate acceptance of the abort command and subsequent completion of the abort command via assertion of a sixth set of bits maintained in a sixth set of registers of the NVDIMM, the assertion of the sixth set of bits based on the register map, the sixth set of registers accessible to the requestor through the SMBus interface.

8. The apparatus of claim 6, comprising:
the first command is a save command to preserve data maintained in the volatile memory at a given point in time; and
a save component for execution by the circuitry to save the data in a first region of the non-volatile memory and maintain an association between a first global unique identifier (GUID) indicated by the requestor, the GUID indicated with the save command.

9. The apparatus of claim 6, comprising:
the first command is a restore command to restore data saved in the non-volatile memory to the volatile memory; and
a restore component for execution by the circuitry to restore the data from a first region of the non-volatile memory, the first region previously associated with a first global unique identifier (GUID) indicated by the requestor, the GUID indicated with the restore command.

10. The apparatus of claim 6, comprising:
the first command is an erase command to erase data saved in the non-volatile memory: and
an erase component for execution by the circuitry to erase the data from a first region of the non-volatile memory, the first region previously associated with a first global unique identifier (GUID) indicated by the requestor, the GUID indicated with the erase command.

11. The apparatus of claim 6, comprising:
the first command received by the receive component is an arm command;
an arm component for execution by the circuitry to cause one or more capacitors coupled with the NVDIMM to charge; and
a save component for execution by the circuitry capable of implementing a catastrophic save using power supplied by the one or more capacitors to preserve data maintained in the volatile memory if a direct current power supply loss is sensed or expected.

12. The apparatus of claim 11, comprising:
the receive component to receive a disarm command from the requestor, the disarm command received via assertion of a fifth set of bits maintained in a fifth set of registers of the NVDIMM, the assertion of the fifth set of bits based on the register map, the fifth set of registers accessible to the requestor through the SMBus interface; and
the arm component to allow the one or more capacitors to discharge responsive to the disarm command; and
the indicate component to indicate acceptance of the disarm command and subsequent completion of the disarm command via assertion of a sixth set of bits maintained in a sixth set of registers of the NVDIMM, the assertion of the sixth set of bits based on the register map, the sixth set of registers accessible to the requestor through the SMBus interface.

13. The apparatus of claim 1, the non-volatile memory including NAND flash memory and the volatile memory including dynamic random access memory (DRAM).

14. A method comprising:
receiving, at a controller, a status request, the controller for a non-volatile memory capable of preserving data maintained in volatile memory, the non-volatile and the volatile memory resident on a non-volatile dual in-line memory module (NVDIMM);
determining a status responsive to the status request;
indicating the status via selective assertion of a first set of bits maintained in a first set of registers of the NVDIMM, the selective assertion based on a register map;
receiving, at the controller, a first command via assertion of a second set of bits maintained in a second set of registers of the NVDIMM, the assertion of the second set of bits based on the register map; and
indicating acceptance and completion status of the first command via assertion of a third set of bits maintained in a third set of registers of the NVDIMM, the assertion of the third set of bits based on the register map.

15. The method of claim 14, comprising the first set of registers accessible to a requestor of the status request through a system management bus (SMBus) interface.

16. The method of claim 15, the status request comprising a request for a state of the controller or of the NVDIMM.

17. The method of claim 15, the second set of registers accessible to the requestor through the SMBus interface and the third set of registers accessible to the requestor through the SMBus interface.

18. The method of claim 17, comprising:
indicating a first completion status of the first command via assertion of a fourth set of bits maintained in a fourth set of registers of the NVDIMM, the assertion of the fourth set of bits based on the register map, the first completion status including a successful completion of the first command or a failure to complete the first command, the fourth set of registers accessible to the requestor through the SMBus interface.

19. The method of claim 18, comprising:
receiving an abort command from the requestor to abort the first command via assertion of a fifth set of bits maintained in a fifth set of registers of the NVDIMM, the assertion of the fifth set of bits based on the register map, the fifth set of registers accessible to the requestor through the SMBus interface; and
indicating acceptance of the abort command and subsequent completion of the abort command via assertion of a sixth set of bits maintained in a sixth set of registers of the NVDIMM, the assertion of the sixth set of bits based on the register map, the sixth set of registers accessible to the requestor through the SMBus interface.

20. At least one non-transitory machine readable medium comprising a plurality of instructions that in response to being executed by system at a host computing platform cause the system to:
send a status request to a controller for a non-volatile memory capable of preserving data maintained in volatile memory, the non-volatile and the volatile memory resident on a non-volatile dual in-line memory module (NVDIMM) coupled with the host computing platform;
access a first set of bits maintained in a first set of registers of the NVDIMM through a system management bus (SMBus) interface, the first set of bits indicating a status indicated by the controller responsive to the status request via selective asserting of the first set of bits based on a register map;
send a command via assertion of a second set of bits maintained in a second set of registers of the NVDIMM, the assertion of the second set of bits based on the register map; and
receive an indication of acceptance and completion status of the command via a third set of bits maintained in a third set of registers of the NVDIMM.

21. The at least one non-transitory machine readable medium of claim 20, the status request comprising a request for a state of the controller or of the NVDIMM.

22. The at least one non-transitory machine readable medium of claim 20, the assertion of the second set of bits based on the register map, the second set of registers accessible through the SMBus interface; and the third set of bits asserted by the controller, based on the register map, the third set of registers accessible through the SMBus interface.

23. A system comprising:
circuitry for a host computing platform to implement a basic input/output system (BIOS), an application or a device driver;
a non-volatile dual in-line memory module (NVDIMM) having resident non-volatile memory and volatile memory, the non-volatile memory capable of preserving data maintained in a volatile memory; and
a controller for the non-volatile memory, the controller operative to:
receive a status request from the BIOS, the application or the device driver, the status request comprising a request for a health status of the NVDIMM, a state of the controller or a state of the NVDIMM;
determine a status responsive to the status request;
indicate the status via selective assertion of a first set of bits maintained in a first set of registers of the NVDIMM, the selective assertion based on a register map; and
receive a command from the BIOS, the application or the device driver via assertion of a second set of bits maintained in a second set of registers of the NVDIMM, the assertion of the second set of bits based on the register map.

24. The system of claim 23, comprising the first set of registers accessible to the BIOS, the application or the device driver through a system management bus (SMBus) interface.

25. The system of claim 24, the second set of registers accessible to the BIOS, the application or the device driver through the SMBus interface, the controller operative to:
indicate acceptance and completion status of the command via assertion of a third set of bits maintained in a third set of registers of the NVDIMM, the assertion of the third set of bits based on the register map, the third set of registers accessible to the BIOS, the application or the device driver through the SMBus interface; and
indicate a completion status of the command via assertion of a fourth set of bits maintained in a fourth set of registers of the NVDIMM, the assertion of the fourth set of bits based on the register map, the completion status including a successful completion of the command or a failure to complete the command, the fourth set of registers accessible to the BIOS, the application or the device driver through the SMBus interface.

* * * * *